United States Patent
Shah et al.

(10) Patent No.: US 7,594,024 B2
(45) Date of Patent: Sep. 22, 2009

(54) SILICON-BASED STORAGE VIRTUALIZATION

(75) Inventors: Nilesh Shah, Los Gatos, CA (US); Rahim Ibrahim, Mountain View, CA (US); Nghiep Tran, San Jose, CA (US); Tuan Nguyen, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1245 days.

(21) Appl. No.: 10/077,696

(22) Filed: Feb. 13, 2002

(65) Prior Publication Data

US 2003/0037127 A1 Feb. 20, 2003

Related U.S. Application Data

(60) Provisional application No. 60/268,694, filed on Feb. 13, 2001.

(51) Int. Cl.
*G06F 15/16* (2006.01)
(52) U.S. Cl. .................. 709/232; 709/220; 709/238; 709/227; 709/213; 711/4; 711/6; 711/11; 711/100; 370/351; 370/352; 370/353; 370/355; 370/356; 370/357; 370/395.71; 370/395.72
(58) Field of Classification Search ............... 709/220, 709/238, 213, 227, 232; 711/4, 6, 114, 100; 370/351, 352, 353, 355, 356, 357, 395.71, 370/395.72
See application file for complete search history.

(56) References Cited

U.S. PATENT DOCUMENTS

| | | | |
|---|---|---|---|
| 5,455,834 A | 10/1995 | Chang et al. | |
| 5,668,968 A | 9/1997 | Wu | |
| 5,787,494 A | 7/1998 | DeLano et al. | |
| 6,067,608 A | 5/2000 | Perry | |
| 6,145,028 A | 11/2000 | Shank et al. | |
| 6,208,543 B1 | 3/2001 | Tupuri et al. | |
| 6,247,077 B1 | 6/2001 | Muller et al. | |
| 6,256,748 B1 | 7/2001 | Pinson | |
| 6,289,376 B1 | 9/2001 | Taylor et al. | |
| 6,295,575 B1 | 9/2001 | Blumeneau | |
| 6,400,730 B1 | 6/2002 | Latif et al. | |
| 6,421,711 B1 * | 7/2002 | Blumenau et al. | ........... 709/213 |
| 6,442,666 B1 | 8/2002 | Stracovsky | |
| 6,453,404 B1 | 9/2002 | Bereznyi et al. | |

(Continued)

FOREIGN PATENT DOCUMENTS

EP 0 380 854 A2 9/1989

OTHER PUBLICATIONS

Robert M. Montague et al., "Virtualizing the San", Morgan Keegan & Company, Inc., Jul. 5, 2000, pp. 1-20.

(Continued)

*Primary Examiner*—Ario Etienne
*Assistant Examiner*—Barbara N Burgess
(74) *Attorney, Agent, or Firm*—Wiesner & Associates; Leland Wiesner

(57) ABSTRACT

A storage server in a storage area network (SAN) environment connecting host computers and storage devices. The storage server includes a plurality of storage processors and a switching circuit. Data is routed between the storage processors via the switching circuit according to routing tags. The routing tags are examined prior to completely receiving the data, allowing the data to be routed with minimal delay.

21 Claims, 8 Drawing Sheets

U.S. PATENT DOCUMENTS

| | | | |
|---|---|---|---|
| 6,636,239 B1* | 10/2003 | Arquie et al. | 715/736 |
| 6,640,278 B1* | 10/2003 | Nolan et al. | 711/6 |
| 6,671,280 B1* | 12/2003 | Bass et al. | 370/395.53 |
| 6,775,230 B1* | 8/2004 | Watanabe et al. | 370/228 |
| 6,952,734 B1* | 10/2005 | Gunlock et al. | 709/227 |
| 7,089,293 B2 | 8/2006 | Grosner et al. | |
| 2002/0019958 A1* | 2/2002 | Cantwell et al. | 714/11 |
| 2002/0026558 A1* | 2/2002 | Reuter et al. | 711/114 |
| 2002/0073257 A1* | 6/2002 | Beukema et al. | 710/105 |
| 2002/0112113 A1* | 8/2002 | Karpoff et al. | 711/4 |
| 2003/0236945 A1* | 12/2003 | Nahum | 711/114 |
| 2006/0120389 A1* | 6/2006 | Sampath et al. | 370/401 |

OTHER PUBLICATIONS

IBM, IBM Network Processor (IBM32NPR161EPXCAC133), Product Overview, Nov. 4, 1999, pp. 1-17.

* cited by examiner

SILICON-BASED STORAGE VIRTUALIZATION

CROSS-REFERENCES TO RELATED APPLICATIONS

This application claims priority to U.S. Provisional Application No. 60/268,694, filed Feb. 13, 2001 and titled "Virtual Storage Systems", which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to storage area network (SAN) systems.

Storage area networks, or SANs, are networks of storage subsystems connected to servers. The goal of a SAN is to allow multiple servers of different operating systems (Unix, NT) to each "see" one large data repository. SANs provide four key benefits over direct attached storage: reduced utilization (increased bandwidth) on the Local Area Network and increased reliability, manageability, and scalability.

A current trend in SANs is storage virtualization. Storage virtualization describes the process of representing, to a user, a number of discrete physical storage devices as a single storage pool having a single set of characteristics. For example, in a storage area network connecting host computers with storage devices, the user perceives a single block of disk space with a defined reliability (e.g., 100 GB at RAID1); however, the user's host computer is configured to access the storage devices such that 100 GB at RAID1 is provided, regardless of whether the data is stored on a single RAID1 disk array or is split across multiple, separate disks.

Most of the solutions available in the marketplace today to virtualize SAN are software based. There are solutions that are host based, storage based and SAN based. For host based solution, each host computer must be aware of the storage devices connected to the storage area network because each host computer manages the storage virtualization that is presented to its users. When the storage devices connected to the storage area network are modified (such as a new device being added or an existing device being removed), each host computer must be reconfigured to accommodate the modification. Such reconfiguration involves work by network administrators and are error prone. The storage based solutions have similar issues. The SAN based solutions are better than the host and storage based solutions but lack scalability and performance.

The present invention is directed toward improvements in this and other areas.

BRIEF SUMMARY OF THE INVENTION

According to one embodiment of the present invention, a storage server in a storage area network connects host computers and storage devices. The storage server includes storage processors interconnected by a switching circuit. The storage server also includes a processor that configures a path between two storage processors based on a command packet. Data is then routed on the path more quickly than in many existing systems. In one embodiment, routing tags are associated with the data packets, the storage processors examine the routing tags without having to wait until the entire data packet is received, and one storage processor begins routing data packets to another storage processor in accordance with the routing tags without having to examine or receive the entire data packet.

A fuller understanding of the present invention may be obtained by reference to the following drawings and related detailed description.

DETAILED DESCRIPTION OF THE INVENTION

The detailed description is organized as follows. First, an overview is given of the overall system implementing the present invention. Second, a high-level description is provided of the features of the present invention. Finally, supporting low-level details are provided that further detail the features of the present invention.

Overview

Figure 1:
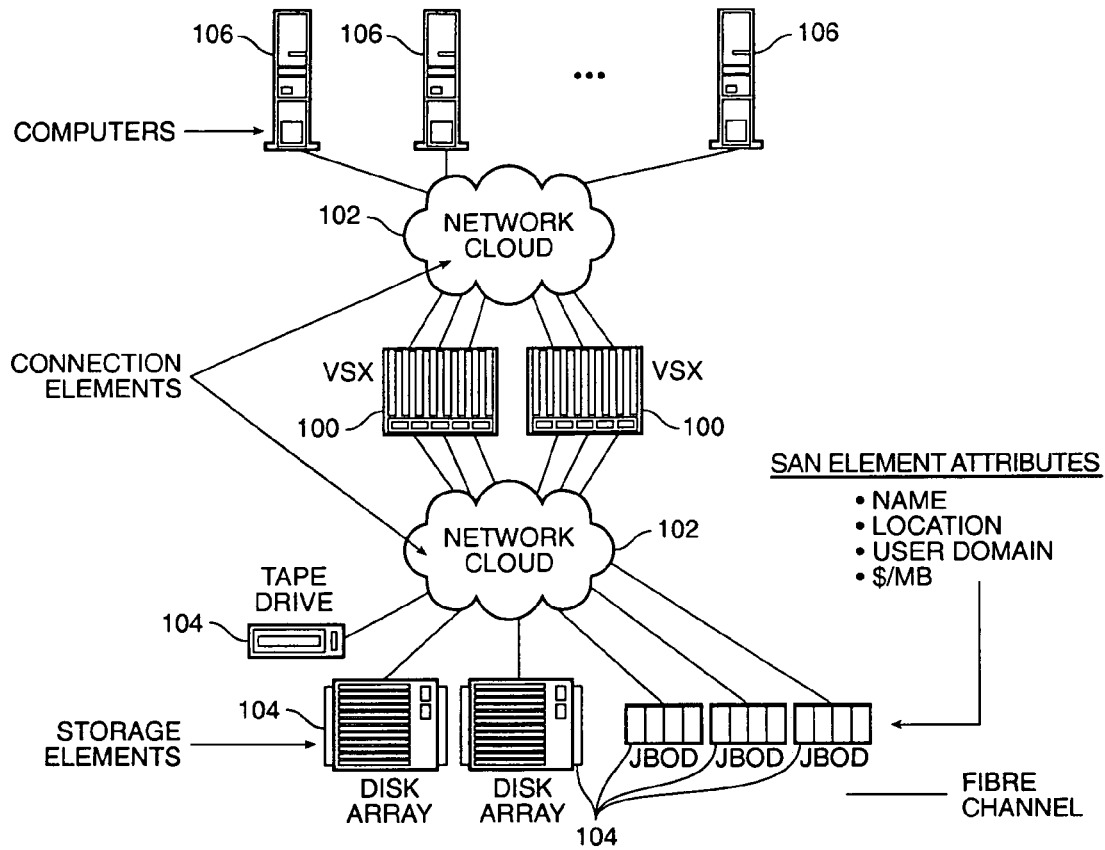
FIG. 1 is a block diagram of a storage area network including a storage server according to an embodiment of the present invention.

FIG. 1 shows a storage server 100 according to an embodiment of the present invention. The figure also shows a storage area network (SAN) 102, a number of physical storage devices 104, and a number of host computers 106.

Figure 2A:
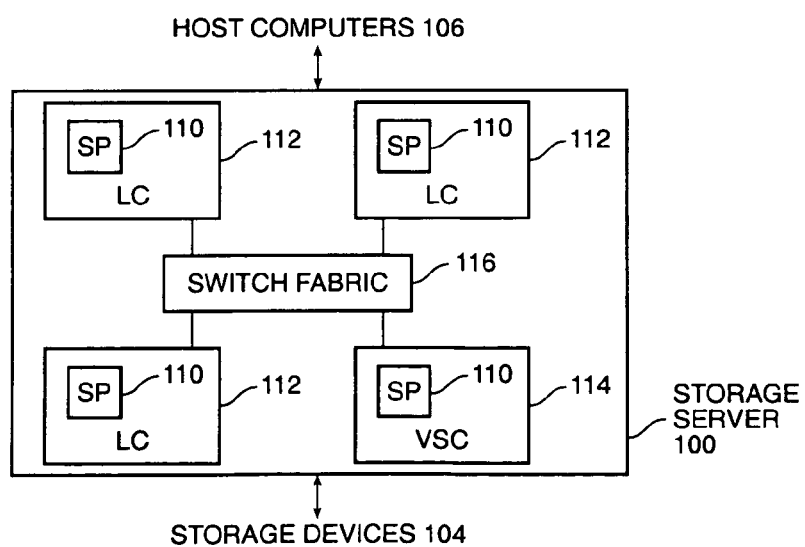
FIG. 2A is a block diagram of hardware components in the storage server according to an embodiment of the present invention.

The storage server 100 is also referred to as a Virtual Storage Exchange (VSX) or Confluence Virtual Storage Server (CVSS), and is further detailed in FIG. 2A. The storage server 100 provides storage virtualization to servers in a homogeneous as well as a heterogeneous environment, providing a solution to large data centers, ISPs, SSPs, and ASPs in the area of network storage.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disks"), or other types of data storage devices. The physical storage devices 104 can be connected directly to the host computers 106 via the SAN 102 or can be indirectly connected to the host computers 106 via the SAN 102 and the storage server 100. As discussed above in the Background, management of storage virtualization is burdensome when the storage devices 104 are directly connected to the host computers 106 via the SAN 102. The present invention improves management of storage virtualization by using the storage server 100 to indirectly connect the storage devices 104 to the host computers 106.

The host computers 106 can be servers or stand-alone computers. The host computers 106 can be directly connected to the SAN 102 or indirectly connected via a switch, router, or other communication link.

FIG. 2A is a block diagram of the storage server 100 showing the hardware components related to embodiments of the present invention, including a storage processor 110, a line card 112, a virtual server card 114, and a switch fabric 116.

The storage server 100 may include one or more storage processors 110. The storage processors 110 process the storage commands and data to be stored as information flows between the host computers 106 and the storage devices 104. One or more of the storage processors 110 may be included on each line card 112. The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114. The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Figure 2B:
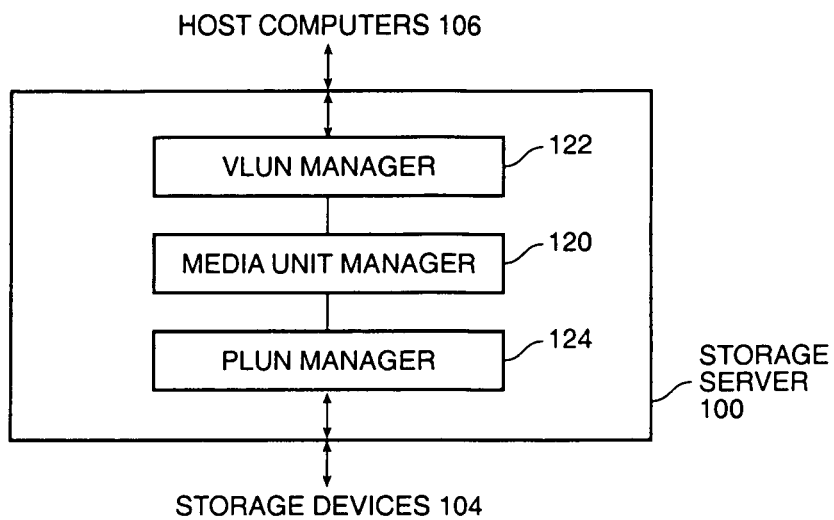
FIG. 2B is a block diagram of management functions in the storage server according to an embodiment of the present invention.

FIG. 2B is a block diagram of the storage server 100 showing the functionality relevant to embodiments of the present invention. The functions of the storage server 100 may be implemented by one or more processors that execute processing according to one or more computer programs, microcode segments, hardware structures, or combinations thereof. The functions relevant to the present invention are the media unit (MU) manager 120, the virtual logical unit number (virtual LUN or VLUN) manager 122, and the physical logical unit number (physical LUN or PLUN) manager 124. Additional details of the storage server 100 are provided in other applications assigned to the present assignee and filed on February 13, 2002 that claim the benefit from the above noted Provisional Application No. 60/268,694 and are hereby incorporated herein by reference as follows: U.S. Pat. No. 7,415,506 titled "Storage Virtualization and Storage Management to Provide Higher Level Storage Services", U.S. Pat. No. 7,203,730 titled "Method and Apparatus for Identifying Storage Devices", U.S. Pat. No. 6,801,992 titled "System and Method for Policy Based Storage Provisioning and Management", U.S. patent application Ser. No. 10/077,181 titled "Virtual Data Center", U.S. Pat. No. 7,039,827 titled "Failover Processing in a Storage System", U.S. Pat. No. 6,880,062 titled "Data Mover Mechanism to Achieve SAN RAID at Wire Speed", and , U.S. Pat. No. 7,272,848 titled "Method for Device Security in a Heterogeneous Storage Network Environment".

The PLUN manager 124 manages data and command transfer to and from the storage devices 104. Each storage device 104 may have associated therewith a PLUN that is used for identifying each particular storage device 104.

The VLUN manager 122 manages data and command transfer to and from the host computers 106. Each host computer 106 may be associated with one or more VLUNs. Each VLUN represents a virtual address space (e.g., gigabytes of storage) with defined attributes (e.g., performance parameters, reliability level, etc.). As such, each host computer 106 exchanges data and commands with the storage server 100 with reference to a particular VLUN.

The MU manager 120 basically translates between VLUNs and PLUNs. The MU manager 120 is responsible for managing the address space of all the storage devices 104 (physical LUNs) connected to the storage server 100. The MU manager 120 also manages the address space of the storage constructs built within the storage server 100, including slices, concatenations, RAID0 (stripes) and RAID1 (mirrors).

The MU manager 120 uses an abstract block-storage addressing technique that enables address spaces to be treated in a logical manner, regardless of the underlying storage constructs or physical LUNs. These logical address spaces can be combined together into more complex and feature rich storage constructs, which are also treated simply as abstract block-storage address spaces.

Used in conjunction with a virtual LUN, these logical address spaces can be configured to appear as LUNs on a multi-ported storage device. This process of presenting physical LUNs as logical address spaces on virtual devices is referred to as storage virtualization.

Abstract block-storage addressing is achieved via a data structure known as a media unit (MU).

Figure 3:
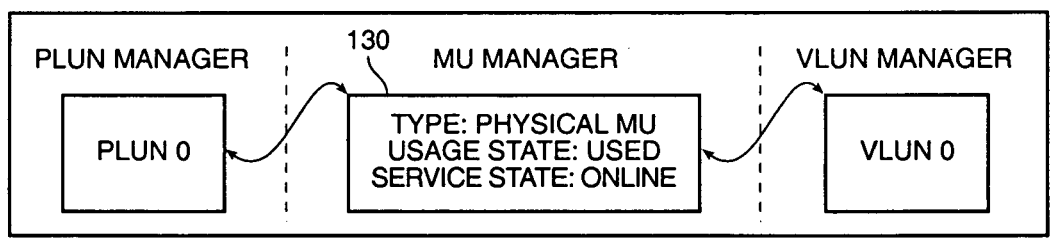
FIG. 3 is a diagram showing the relationship between PLUNs, media units and VLUNs according to an embodiment of the present invention.

FIG. 3 shows the relationship between physical media units and the other services. The PLUN manager 124 manages PLUNs, the MU manager 120 manages media units, and the VLUN manager 122 manages VLUNs.

In addition, FIG. 3 shows the relationships between PLUNs, media units, and VLUNs. Generally, a PLUN directly corresponds to a storage device, such as a disk or a disk array. Such a direct one-to-one is relationship generally shown in the following figures. However, a PLUN can also be associated with a portion of the storage device. Multiple PLUNs can be associated with different portions of a single storage device.

Each physical media unit (first-level media unit) generally directly corresponds to a single, respective PLUN.

Each VLUN is generally associated with a single, respective media unit.

The following sections further describe some aspects of the present invention.

High-Level Description

According to one embodiment, the storage area network is a Fibre Channel network and the storage server 100 includes a number of Fibre Channel ASICs that convert Fibre Channel frames into a second format for internal processing by the storage server 100. These Fibre Channel ASICs are further described in the Provisional Application No. 60/317,817.

Figure 4:
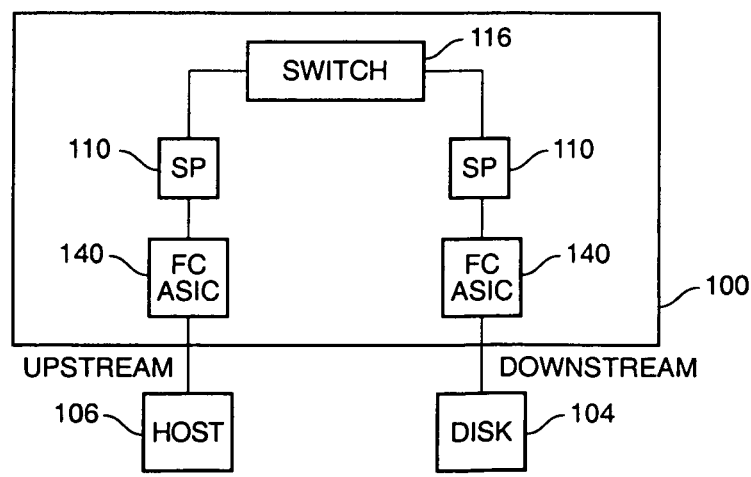
FIG. 4 is a block diagram showing upstream and downstream components according to an embodiment of the present invention.

FIG. 4 is a block diagram showing upstream and downstream storage processors 110 and Fibre Channel ASICs 140. The term "upstream" is used to refer to the components closest to the host computers 106, and the term "downstream" is used to refer to the components closest to the storage devices 104. According to one embodiment, each storage processor 110 uses a Fibre Channel ASIC to connect four 1 GB/s Fibre Channel ports.

Figure 5:
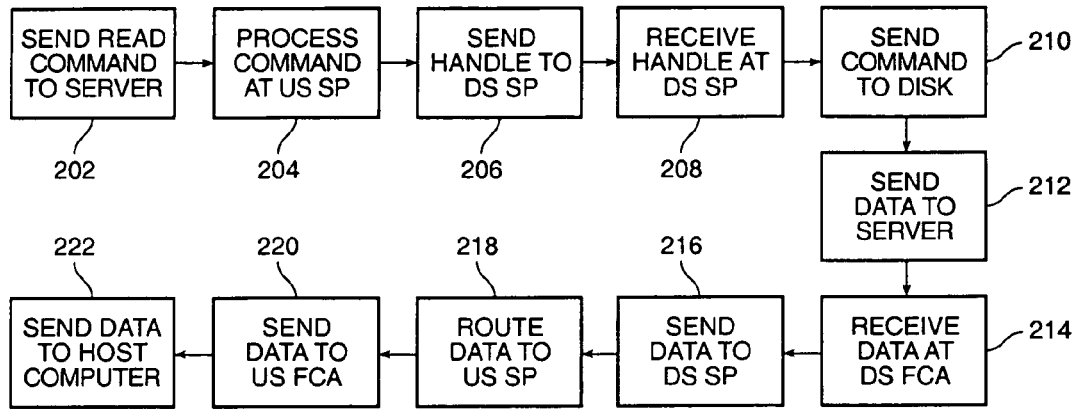
FIG. 5 is a flow diagram showing command and data processing according to an embodiment of the present invention.

FIG. 5 is a flowchart of a read process 200 according to an embodiment of the present invention. In general, read and write traffic is handled by the storage processors 110. Specialized hardware (referred to as microengines) in the storage processors may be used to implement these processing steps. These storage processors are generally referred to as the virtualization engine. Non-read/write commands may be handled by an embedded CPU.

In step 202, a host computer 106 sends a read command to the storage server 100 through the storage area network 102. This read command may be in the form of a command packet (also referred to as a command frame). The read command arrives at the storage server 100 and is processed by the upstream Fibre Channel ASIC.

In step 204, the command arrives at the upstream storage processor. The command includes what is referred to as a command handle. The upstream storage processor looks for the host LU from the command handle using the tree search engine. From the host LU, the upstream storage processor finds the virtual unit and starts decomposing the request into physical units.

The tree search engine looks up the host LU in a lookup table. The lookup table contains virtualization information; that is, information that relates the virtual storage space (that the host computers see) to the physical storage space (that may be provided by multiple physical disks). The lookup table is programmed by the VSC 114 (see FIG. 2A) using configuration commands.

In step 206, the upstream storage processor passes a handle via the switching circuit to the downstream storage processor to identify the device to talk to.

In step 208, the handle arrives at the downstream storage processor.

In step 210, the downstream storage processor, from the handle passed in, sends the command to the correct physical disk. The downstream storage processor sends the command along with routing tags and a storage processor command handle. The routing tags and SP command handle are used when a data frame (or data packet) returns. The above steps 206-210 in effect configure a path between the upstream and the downstream storage processors.

In step 212, the physical disk sends a data frame (data packet) back through the storage area network to the storage server 100.

In step 214, the downstream Fibre Channel ASIC receives the data frame. The downstream Fibre Channel ASIC performs exchange management and looks up the command context.

In step 216, the downstream Fibre Channel ASIC sends the data frame along with the routing tags and a SP command handle.

In step 218, the downstream storage processor receives the data frame. The routing tags allow the downstream storage processor to route the frame to the upstream storage processor (via the switching circuit) even before the entire packet arrives. According to one embodiment, the first 64 bytes of the data frame are inspected before the full payload arrives.

In step 220, the data packet arrives at the upstream storage processor (via the switching circuit). The upstream storage processor references the data context and sends the data frame out along with the corresponding Fibre Channel ASIC command handle to allow it to get command context.

In step 222, the upstream Fibre Channel ASIC performs exchange management (using the command handle) and sends out the data frame to the host computer 106 via the storage area network 102.

Although FIG. 4 is particularly directed toward a read process, a write process involves similar steps.

According to another embodiment, the storage server 100 may generate the commands internally. Commands can be generated internally when data is to be transferred from one storage device to another, or when data is to be duplicated or reconstructed on a second storage device.

According to another embodiment, the host computer and the storage device may be connected to the same storage processor. In such a case, the upstream and downstream storage processors are the same storage processor.

More extensive details of these processes follow.

Low-Level Details

As discussed above, the storage server 100, also referred to as the Virtual Storage Exchange (VSX), includes multiple Storage Processors (SPs) inter-connected by redundant switching circuits. The VSX also has at least one CPU for configuration and management of these SPs. The CPU also provides higher level storage services.

The SCSI processing is handled by the SPs. Each SP has the following components:

1. 16 micro-engines that handle the Read/Write Commands;

2. An embedded CPU that handles all the non-Read/Write Commands including Error Recovery;

3. A Hardware Classifier that identifies a frame type;

4. A Dispatch Unit to enqueue a frame to a correct microcode handler running in the micro-engines;

5. A Tree Search Engine to find a leaf entry for a given pattern;

6. A Counter Engine, which is a coprocessor that allows statistics collection (up to 4M counters in one embodiment); and 7. A Switch interface that connects the SP to the switching circuit (also referred to as the switch fabric).

The Read/Write Commands are processed by the Micro-engines. The RD/WR command processing is further described below.

A Command is received at the upstream SP and the upstream SP does most of the processing of the command. It authenticates the command/access controls, determines where to ship the command, calculates the new start logical block address (LBA) and request blocks, builds the new command data block (CDB) and ships it to the downstream SP. If there is only one path to get to the target device, the upstream SP builds a completed command, which will then be forwarded to the target device via downstream SP and FC-ASIC. If the downstream SP has several paths to get to the target device, the upstream SP leaves up to the downstream device to choose the access path. In that case, the downstream SP will fill in the appropriate information about the access path and forward it to the target device via FC-ASIC.

When a command frame enters the SP, the ingress command handler (running in micro-engines) will be called. The command handler (CmdHandler) allocates an IO Control Block (IoCB) structure to store the command context and to keep track of the state of the command. From the command information, the CmdHandler constructs a search-key that includes SP port, FC-ASIC Device Handle, and FC LUN (logical unit number). The search-key is passed into SP Tree Search Engine (TSE) to search for the hardware LUN (HLUN) associated with the command. If the search fails, the command will be rejected due to non-existing LUN; otherwise, the command processing will be continued. HLUN is a structure that ties the server and a virtual LUN (VLUN); therefore, the associated VLUN structure can be retrieved via HLUN information.

Based on the start LBA/number of blocks requested in the received command and the VLUN information, the CmdHandler decomposes the received command to a set of physical commands (the set might be one or more commands depending on the aforementioned information). If more than one physical command (pCmd) are decomposed, each pCmd has its own IoCB (referred to as a child IoCB or cIoCB) that is used to store its own command context. These cIoCBs are linked to the original IoCB (referred to as a master IoCB or mIoCB). Thereafter, the CmdHandler builds these commands with their physical start LBAs and numbers of blocks that are mapped to the physical target devices. These commands will then be sent to the downstream SPs that directly connect to the target devices. The reference to IoCB is also passed between upstream SP and downstream SP as command handles (upstream command handle and downstream command handle) that will be used to locate the IoCB associated to the command.

As mentioned earlier, the downstream SP might have more than one access path to the target device. If there is a single access path, pDevpath key is passed from upstream SP to downstream SP; otherwise, pLUN key is passed. In multipath scenario, the downstream CmdHandler searches for the physical LUN (PLUN) and chooses an access path, pDevpath. This leads to another search. In the single path scenario, the downstream CmdHandler searches directly pDevpath to get the essential information to access the target device.

Figure 6:
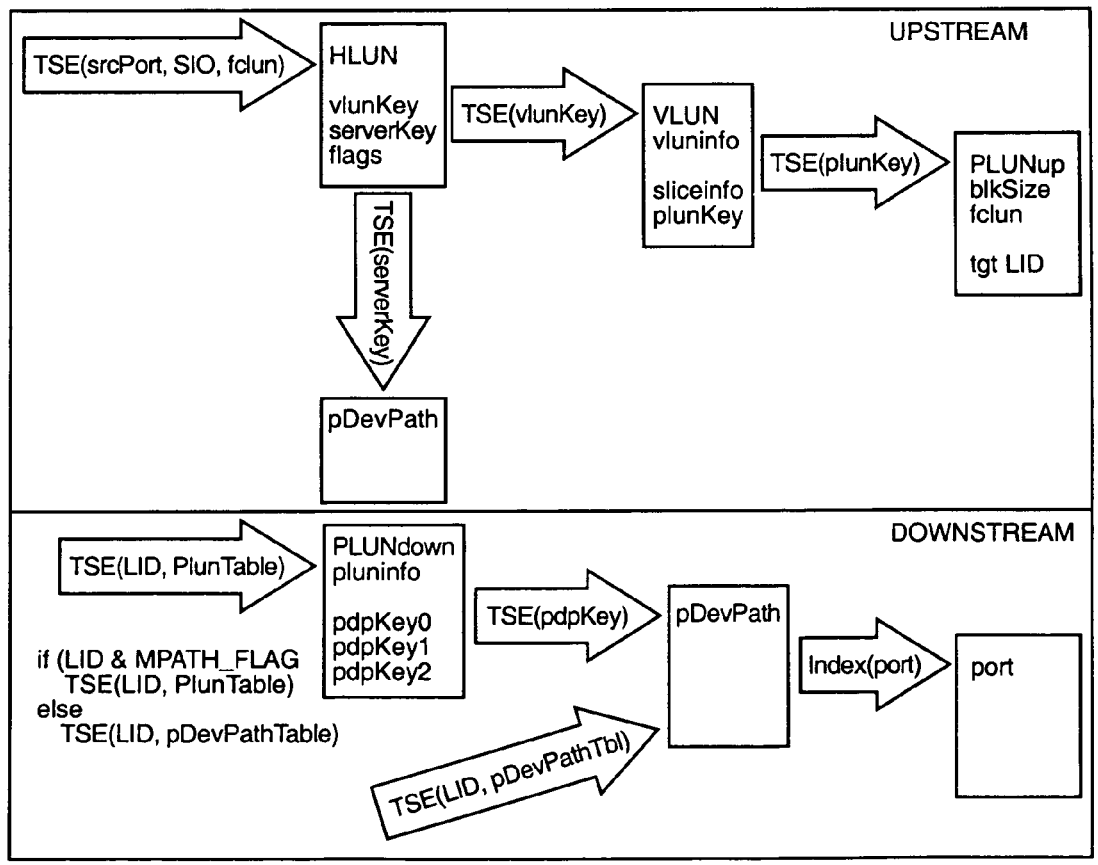
FIG. 6 is a flow diagram showing the processing of the tree search engine according to an embodiment of the present invention.

FIG. 6 shows high-level flow diagrams of read/write command processing. In the upstream path, the tree search engine (TSE) indicates the HLUN, VLUN, PLUNup and pDevPath.

In the downstream path, first the MPATH_BIT is checked. If the MPATH_BIT is clear, then the downstream PLUN does not have multiple paths. The downstream SP will then issue a search to the pDevPath table. If the MPATH_BIT is set, the search will be done on the PLUN table. The PLUN leaf will have all the possible paths to the storage.

Figure 7:
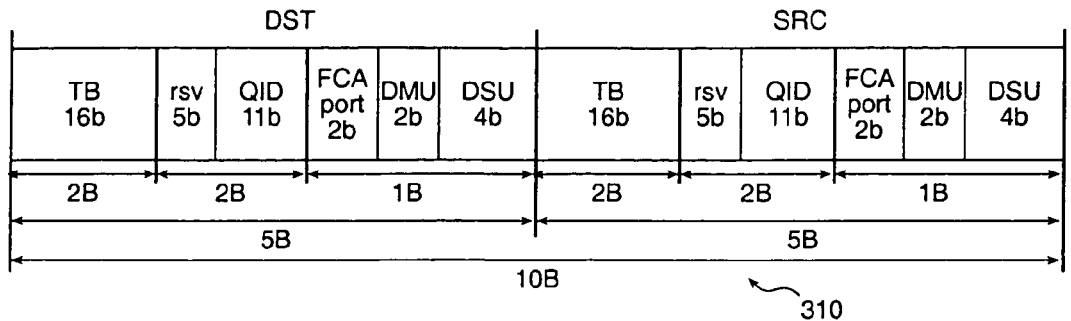
FIG. 7 is a data diagram of routing information according to an embodiment of the present invention.

FIG. 7 shows a data diagram of routing information 310 (see also FIGS. 8 and 9) according to an embodiment of the present invention. The routing information 310 is used between the FC ASIC and the SP.

Upon receiving a command, the command handler bases on the command information and the programmed VLUN information to determine the appropriate access path. Once the access path has been determined, all subsequent frames (transfer ready, data, and status) are forwarding on the same path; therefore, the microcode adds a routing information field that is used to speed up the frame routing process. The routing information is imbedded in the frame. It allows SP microcode to get the routing information directly from the received frame without looking up the IoCB structure first. Since the routing information is within the first 64 bytes of the frame, picocode can start looking at how to route the frame. This improves performance.

Routing information includes the following items:
1. Blade Number: the target SP switch blade number;
2. QID: an encrypted value that is used by SP ENQ coprocessor to route the frame to an SP port;
3. FCAPort: the FC ASIC Port number;
4. DMU: the Data Mover Unit that is used by SP ENQ coprocessor to route the frame to an SP port; and
5. DSU: the Data Store Unit that is used by SP ENQ coprocessor to route the frame to an SP port.

The routing information field consists of 2 parts: DST and SRC. The FC ASIC is given this routing information and will pass it back to the SP unmodified when it sends data, status or a control frame.

The SP looks at the DST routing information field and programs the FCBPage register to route the frame.

The abbreviations for the fields in the routing information are as follows:
1. TB identifies the target blade. This is programmed into the Ingress FCBPage register.
2. QID is used at the target SP when filling up the Egress FCBPage QID field.
3. FCAport is the FCASIC port identifier at the target SP.
4. DMU identifies the target DMU. This is programmed into the Ingress FCBPage register.
5. DSU identifies the target DSU to use. This is programmed into the Ingress FCBPage register.

When a command comes in at the upstream SP, the SRC routing information fields will be filled. The command is then shipped to the downstream SP. The downstream SP will fill in the DST routing information fields. Before shipping it to the FCASIC, the SRC and DST routing information fields are swapped.

When the FCASIC returns with data, control or status, the routing information is returned as is. The SP will look at the DST routing information. Since the SRC and DST were swapped at the previous step, the DST routing information now identifies the upstream SP. The frame can be routed directly to the upstream SP.

At the upstream SP, fields from the DST routing information are used directly to send the frame out. Before sending the frame out, the SRC and DST routing information fields are swapped.

The storage processors operate according to programming code referred to as picocode. The following figures and associated description elaborate on the picocode and related embodiments of the invention.

Figure 8:
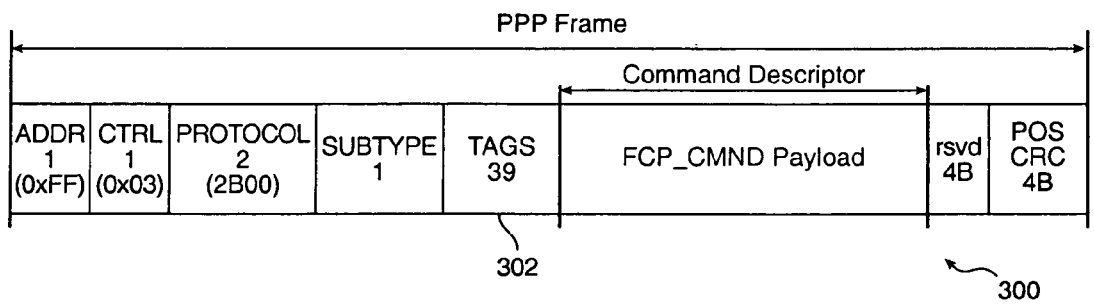
FIG. 8 is a data diagram of a command frame according to an embodiment of the present invention.

FIG. 8 shows a Command Frame 300 encapsulated in PPP format. This is the general frame format employed by the Picocode. The FC frame that enters the SP is encapsulated within an Ethernet frame. The SP hardware classifier will look at the PROTOCOL field to determine which routine to call. The subType is used by microcode to further differentiate the POS frame type.

Figure 9:
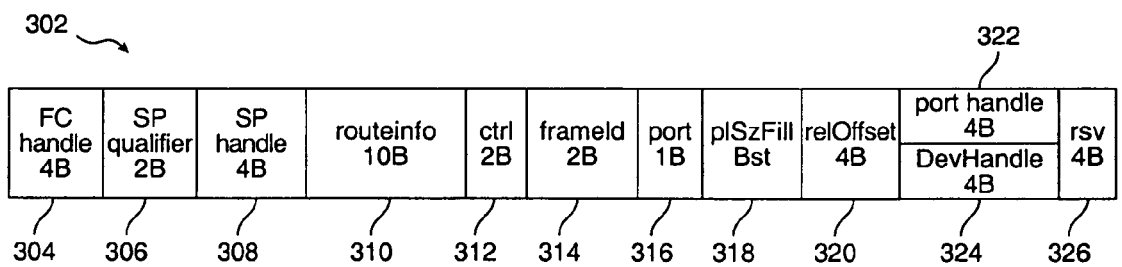
FIG. 9 is a data diagram of the tags field in the command frame according to an embodiment of the present invention.

FIG. 9 shows the format of the TAGS field 302. The TAGS header 302 in the command frame 300 is used to carry unique identifiers between SPs in order to get command context. The TAGS field 302 includes the following data fields.

The FC handle 304 is the handle used by the FC ASIC to get its command handle.

The SP qualifier 306 and SP handle 308 are interpreted as a single handle by the FC ASIC. The SP handle 308 is used by the SP to get its command context.

The routeinfo field 310 is sent by the SP to the FC ASIC in a RDY/ACK frame. The FC ASIC preferably sends the latest one.

The ctrl field 312 is a general-purpose field.

The frameId 314 is a sequentially increasing number. Its use is like SEQ_CNT in a single sequence.

The port 316 identifies the port.

The plSzFillBst (pay load size/fill bits) 318 is inserted by FC ASIC. The field has different meaning depend on the frame type. For the receiving frame, it indicates the total byte count of the payload. For the sending frame, it indicates how many stuff bits filled in the last data word.

The relOffset 320 indicates the relative offset for the data payload. It is only valid in the receiving frame (SP's point of view).

The port handle 322 is used to identify a device the SP wants to talk to when it send a command descriptor down.

The DevHandle 324 is used to store the device handle. It is used by FC ASIC to map the command to the specific device. Its usage is similar to S_ID and D_ID.

The rsvd field 326 is unused.

According to an embodiment of the present invention, there are 3 types of data frames: COMMAND, DATA and STATUS. The Type field in the Ethernet header is set to special defined codes to distinguish between the 3 types. The hardware classifier in the SP uses this field to call the correct entry point.

The SP picocode handles RD and WR command types for virtualized devices. Other commands are sent to the SP to handle. In the case of native devices, the SP picocode forwards all commands/frames to the device except reserve, release commands. Although the number of command types handled by picocode is small, the majority of the traffic is RD/WR commands.

As described above with reference to FIG. 4, this document uses the terms upstream and downstream. Upstream is used to describe the SP that is connected to the server. This is the SP that sees the command. Downstream is used to describe the SP that is connected to the target device. The upstream SP receives a command, processes it and sends it to the downstream SP. The downstream SP receives the command and sends it to the target device.

The upstream SP does most of the processing of the command. The upstream SP determines where to ship the command, calculates the new start logical block address (LBA) and requested blocks, and builds the new CDB and ships it to the downstream SP. The downstream SP takes care of the FC headers, decides which port to send the command frame out, and handles the sequence management to the target device.

Command frames upstream are handled as follows.

When a command frame enters the SP, the ingress command handler is called. Command frames are part of a new FC exchange. An IoCB structure gets allocated for the new command. The IoCB structure is used to keep track of the state of the new command. Sections of the command frame are saved into the IoCB in order to perform sequence management. Command frames are typically 82 bytes according to one embodiment.

The FCPM software module performs the IoCB allocation and saving of the command. It reads in more data from the I-DS since only 64 bytes are brought in. Once this is done, the processing of the command can begin.

The SM software module is called next. This module determines whether an HLUN exists for the command. An HLUN is a structure that ties the server and a VLUN. The SM extracts the source port from the FCBpage structure, FCLUN, and DevHandle from the message header and feeds this to the tree search engine (TSE). If the TSE fails to yield a leaf, an HLUN does not exist and the command is rejected. If the HLUN exists, the processing of the command continues. This module also figures out the command type. In the case that it is not a RD/WR command, it sends the frame to the SP for processing. The SM extracts the starting LBA and number of blocks from the CDB and makes a call to the LM software component to figure out the physical start LBA, number of blocks and the physical destination of the command.

The LM is called with the HLUN search results in the TSR memory. From the HLUN, the LM looks for the VLUN. The physical devices that represent a VLUN may be several disks that may not start at LBA 0. Each physical device behind the VLUN is referred to as a slice. The LM goes through the slices, figures out which slice is called for in this IO request, and calculates the new starting LBA and requested blocks. A request may cross slice boundaries. In this case, the LM allocates child IoCBs and links them to the master request. After the calculation is done, the LM searches for the target physical device. The LM fills in the FCBpage with the destination SP number, target DMU/DSU and fills in the Ethernet header with a plHandle used by the downstream SP to search for the target device. The LM returns back to the SM the FCLUN of the physical target, the starting LBA and number of blocks.

The SM from this information builds the FCP command payload and returns back to the FCPM. The FCPM writes back the frame from the datapool and enqueues the frame to the switch module, ending the command processing on the upstream SP.

Command frames downstream are handled as follows.

The command frame from the upstream SP gets sent downstream. In the Ethernet encapsulation header, the LLC field contains 2 pieces of important information: Upstream Handle and pHandle.

The FCPM module after receiving the command frame allocates an IoCB for the command. The upstream handle is used when the downstream SP needs to send the upstream SP data or status frames related to that command. The upstream handle is sent together with the data or status frames so that the upstream SP will be able to find context to the frame. After receiving the command, the downstream SP sends the upstream SP an ACK/RDY frame containing the downstream handle. This way both upstream and downstream SPs will have each other's handle. The peer handle is sent so that each side can get the frame's command context.

The pHandle passed in can either be a PLUN or a pDevpath lookup. This depends on the pHandle MCAST bit. If the MCAST bit is set, this means that there may be multiple paths to the device. If clear, there is only a single path. If the PLUN is looked up, from the leaf, the LM will decide which path to take. This leads to another search for the pDevpath. With a single path, the pDevpath is looked up directly. The LM extracts maxRxData size and target port. This information is returned to the FCPM. The FCPM constructs a new FC header from the LM returned information and ships the frame out.

Data frames upstream are handled in the following manner.

Data frames upstream can happen in a number of circumstances. For example, when the server is sending write data, the data frames appear on the ingress side. Where the downstream SP is responding with read data, the data frames appear on the egress side.

In the case of the server sending data, the FCPM looks for the IoCB using the returned SPHandle (IOCB address) in the message header. From the IoCB, the SP knows where to ship the data frame.

In the case where data frames are on the egress side, the FCPM looks for the IoCB using the handle passed in through the Ethernet LLC field. This is the IoCB address. From the IoCB, the FCPM decides whether to ship the data to the server or whether it must wait for more data. This may occur in the case of striping, where data may come in out of order.

Data frames downstream are handled in the following manner.

Data frames downstream can happen in a number of circumstances. For example, when the device is responding with read data, these frames appear at the ingress side. When the upstream SP is sending write data, these frames appear at the egress side. The way the SP looks for the IoCB is the same as the explained above.

Status frames downstream are handled in the following manner.

Status frames downstream come from the target device. This happens when the requested operation completes or an exception has occurred. The status data comes together with the status frame.

The FCPM will look for the IoCB using the returned SPHandle (IOCB address) in the message header. The upstream command handle is inserted into the Ethernet encapsulation header. The status frame is shipped upstream and the IoCB is de-allocated. If there are multiple paths to the device, other paths may be attempted.

Status frames upstream are handled in the following manner.

Status frames upstream come from the downstream SP. The FCPM looks for the IoCB from the command handle passed in the Ethernet encapsulation header. The SM subsystem is called and a status frame is generated if necessary. The status frame is for a request on a virtual device. The return status is from a physical device, and may not have the same context. Hence, the SM may regenerate the status frame. The FCPM is finally called to transmit the frame back to the server. After this happens, the IoCB is deallocated.

Figure 10:
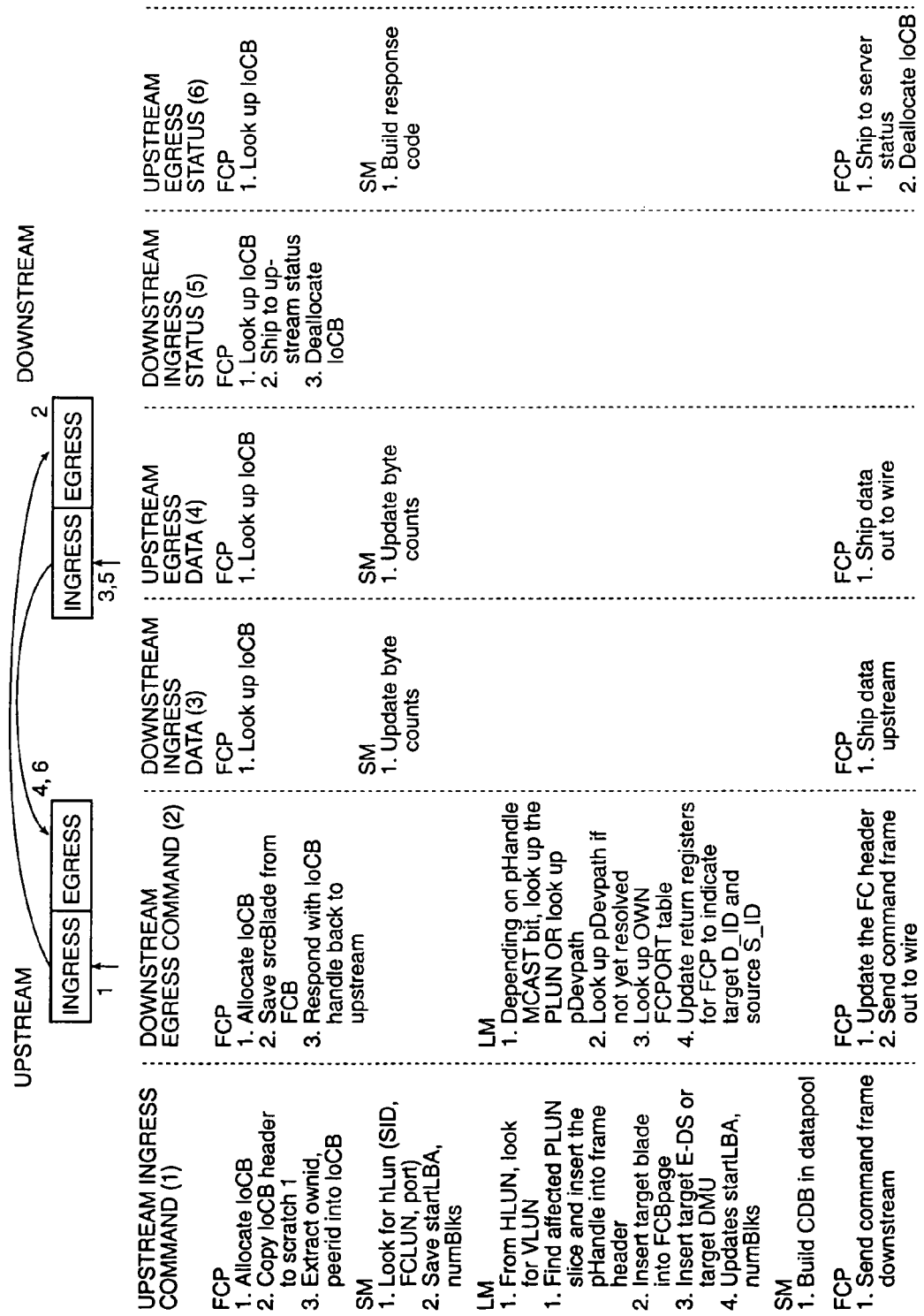
FIG. 10 is a flow diagram of read command processing according to an embodiment of the present invention.

FIG. 10 is a flow diagram of the processing steps in a read command. A read dataflow goes through the same command, data and status phases described above. When a read command is received, the SP decomposes the virtual request into the physical requests.

The FCP protocol assumes that all the buffer space required for the command has already been allocated on the server side. The SP is free to send data back to the server without waiting for XFER_RDY. The flow control is handled by the FC port ASIC using BB credit mechanism on the FC side and PAUSE frames on the GbE side.

In the simple case where the request maps to a single physical device, no reordering is necessary. The path to the device is picked and the physical request is sent to the SP attached to the device. In the case of mirroring, the upstream SP decides which member to read from. In the case of a concatenation or stripe, the SP may generate additional requests from the original one. As data comes back from the downstream SPs, the upstream SP reassembles the data in order before sending it back to the server after NPSIM release.

Figure 11:
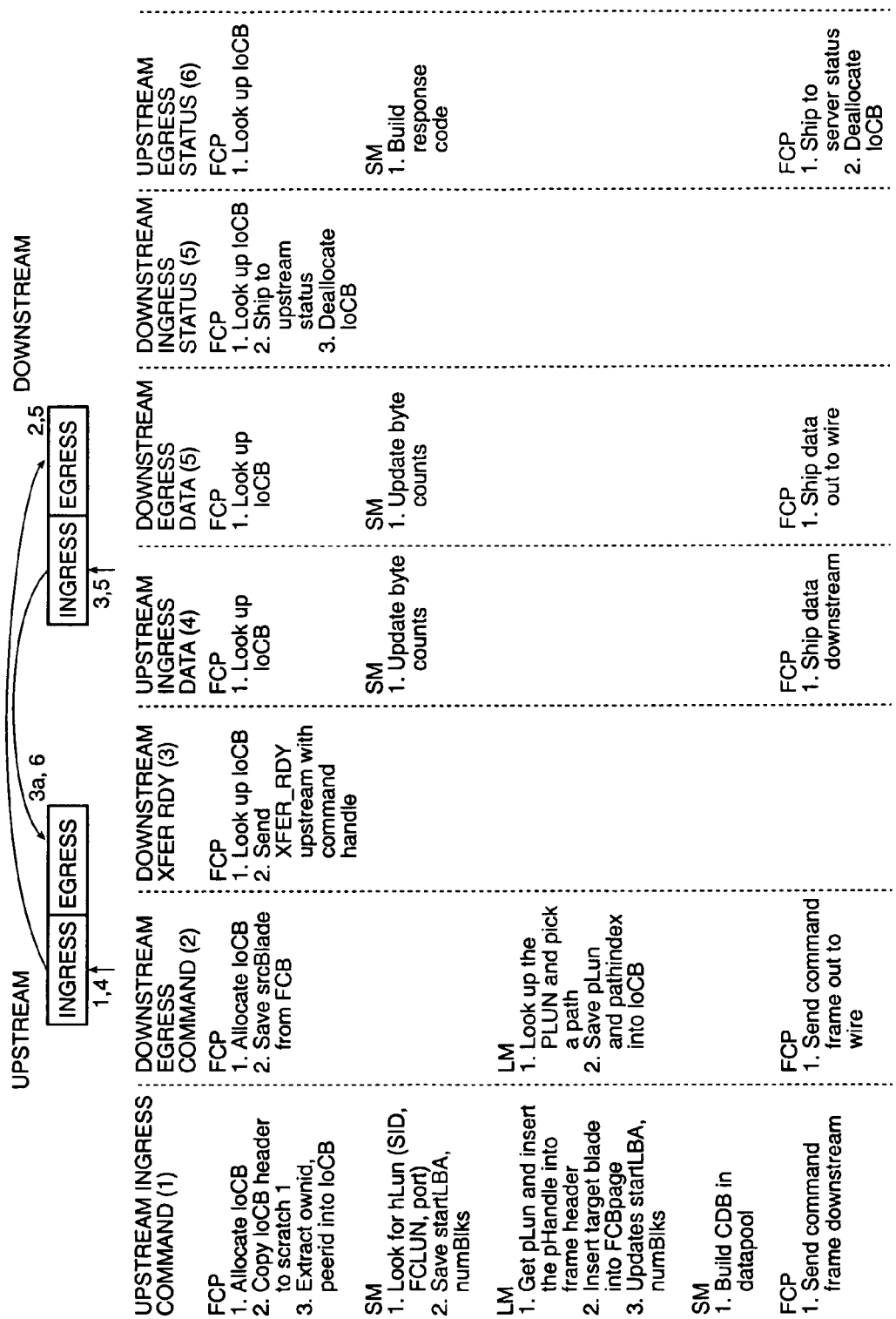
FIG. 11 is a flow diagram of write command processing according to an embodiment of the present invention.

FIG. 11 is a flow diagram of the processing steps in a write command. When a write command is received from the server, the SP figures out the path to the physical device. The write command is more complicated since an XFER_RDY frame should be sent to the server.

The upstream SP preferably will not send an XFER_RDY to the server until it gets the handle back from the downstream SP. The downstream SP preferably will not send the handle back until it gets a XFER_RDY response back from the device.

The upstream SP then sends an XFER_RDY to the server with the same byte count indicated from the downstream SP, starting data flow from the server.

The XFER_RDY is further adjusted to ensure that a data frame does not have to be split across disk boundaries. This modification is done by the upstream SP, and the process continues until the request is complete.

As an optimization, the downstream SP can respond to the upstream SP with a fabricated XFER_RDY. The byte count reported is set to the maximum receive size the device can receive, which is negotiated during the PLOGI process. The upstream SP sends an XFER_RFY to the server. This starts data flowing from the server.

When the target device responds with the XFER_RDY, the downstream SP sends an adjusted byte count back to the upstream SP. The upstream SP sends an XFER_RDY to the server with the new adjusted byte count value. This method is an optimization and will be considered later.

Figure 12:
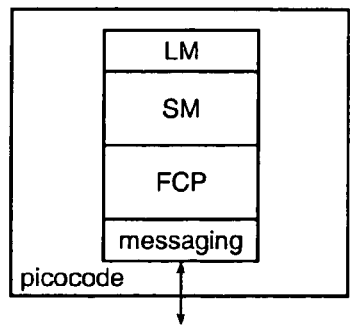
FIG. 12 is a block diagram of the modules in the picocode according to an embodiment of the present invention.

FIG. 12 shows the Picocode software stacks. The messaging layer works to interpret the Ethernet encapsulation, working with the Hardware Classifier to call the correct input functions. The Fibre Channel protocol (FCP) manager keeps track of sequence management and IoCB allocation/de-allocation. The SCSI manager (SM) layer interprets the SCSI commands inside the FCP layer. The LUN Manager (LM) layer takes the virtual request that comes in from the server and decomposes it to the physical request. The utility layer has functions to allocate/de-allocate IoCB's.

This section describes the FCP Manager component in the picocode subsystem (see FIG. 12). In the Picocode software stack, the FCP may be considered as the front-end of the picocode subsystem. In the other words, FCP Manager is set up to intercept all incoming frames. The SP Hardware Classifier (HC) is configured to dispatch the incoming frame to an appropriated frame handler base on the dispatch indicator discussed in the SP HC configuration section.

Different frame handlers perform different set of actions to fulfill the task. The course of actions that are performed by those handlers is discussed in the FCP Public Interface section.

The SP Hardware Classifier Configuration is as follows. Depending on the side of arrival of SP of the incoming frame, SP Hardware Classifier (HC) keys on different fields to dispatch a frame. On the Ingress side, HC bases on E-type to dispatch an incoming frame. Yet, it bases on UC/MC, FHEF, and VSHF to dispatch an Egress incoming frame.

The FC ASIC and SP communicate via Command Descriptor (CD) frames 300 as shown in FIG. 8. While there are certain requirements that both FC ASIC and SP need to ensure in preparing the CD frame header (which includes the fields ADDR, CTRL, PROTOCOL and TAGS 302 in FIG. 8), this section summarizes the CD frame header manipulation on two main IO paths, Read and Write.

Figure 13:
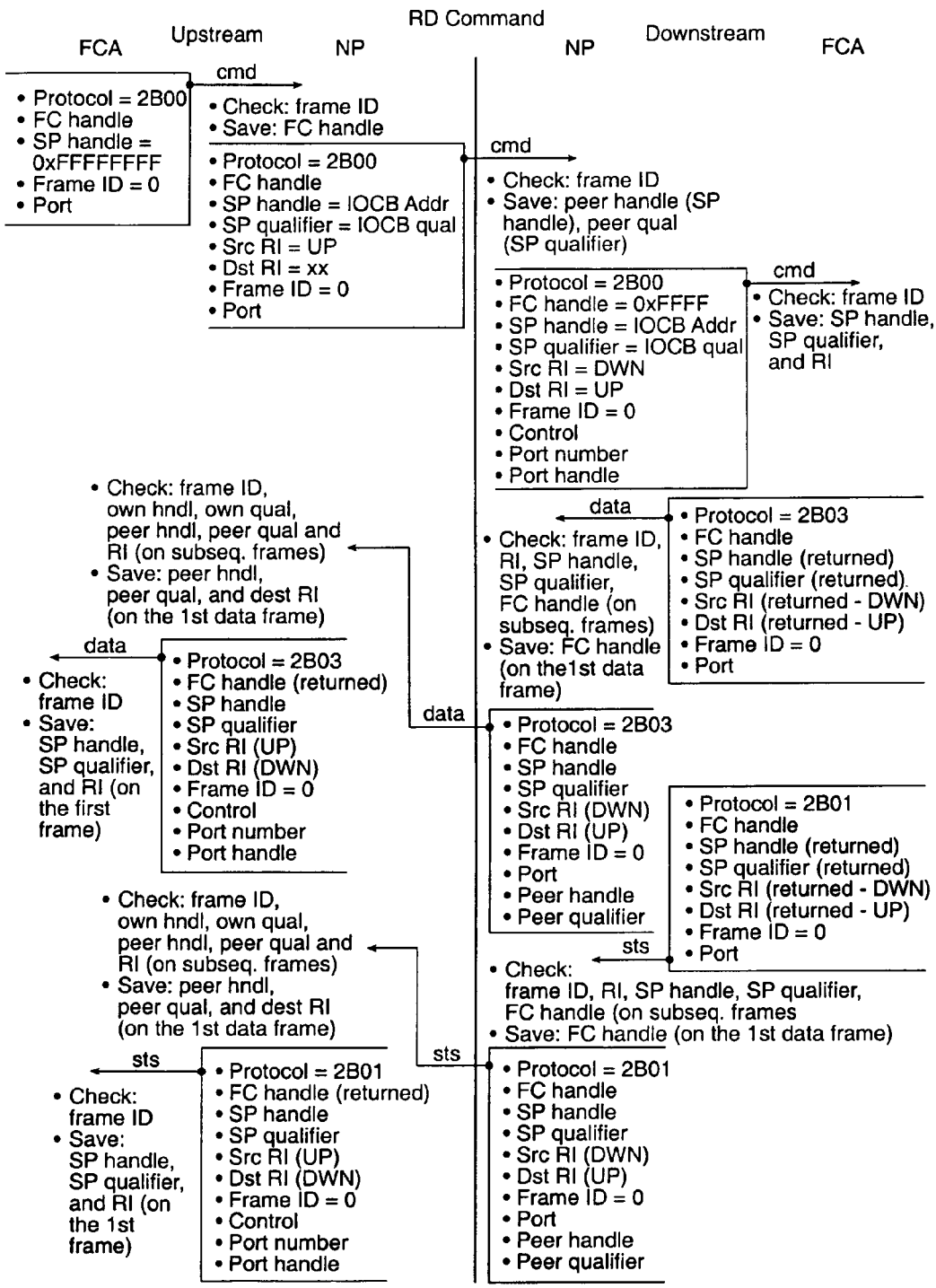
FIG. 13 is a flow diagram of command frame header manipulation in a read operation according to an embodiment of the present invention.
Figure 14:
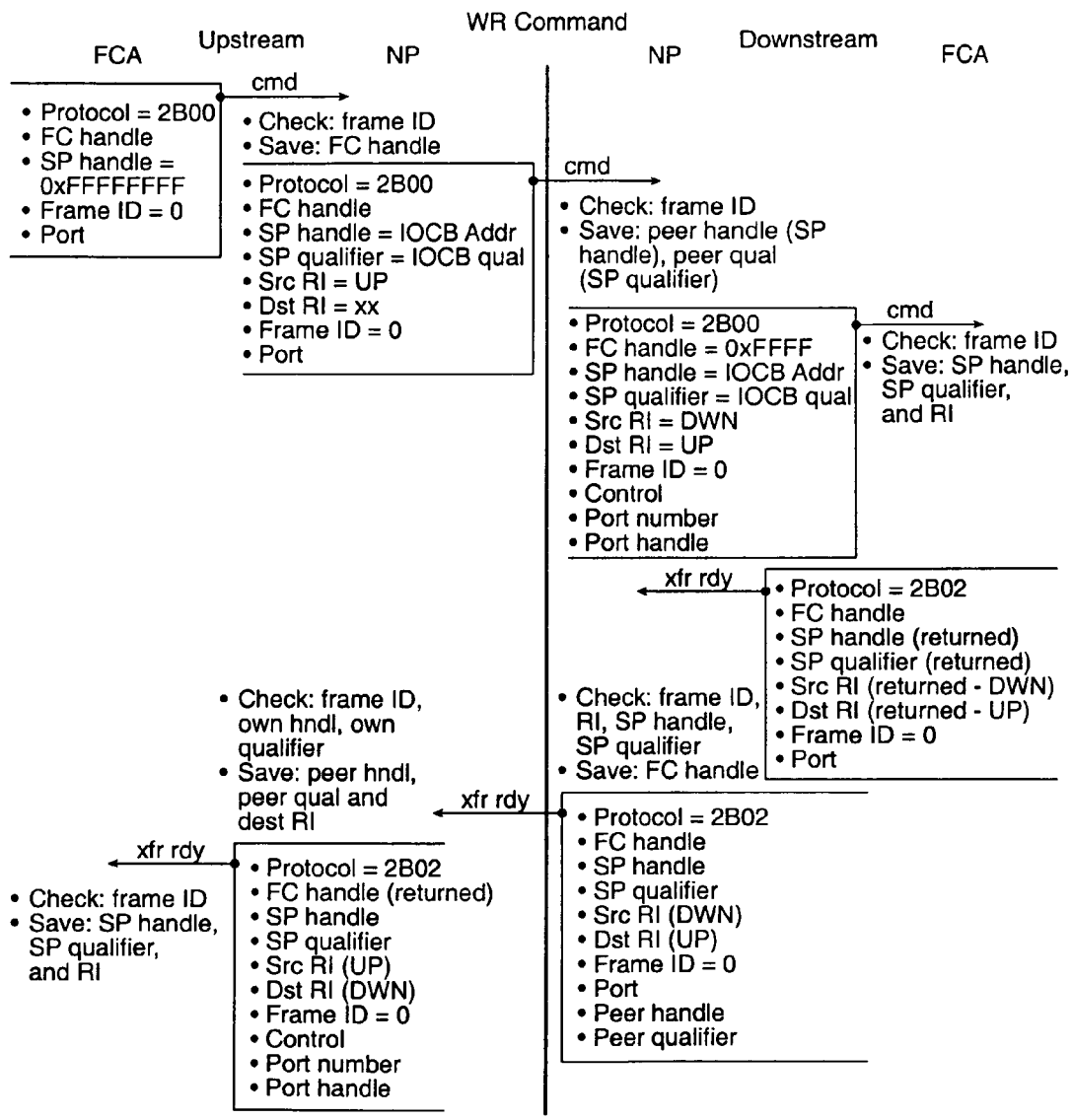
FIG. 14 is a flow diagram of command frame header manipulation in a write operation according to an embodiment of the present invention.

FIG. 13 depicts the CD frame header manipulation on a Read command. FIG. 14 depicts the CD frame header manipulation on a Write command.

The FCP Public Interfaces as part of the picocode (see FIG. 12) include the following: Ingress Command Handler, Egress Command Handler, Ingress Data Handler, Egress Data Handler, Ingress Status Handler, Egress Status Handler, Ingress Xfer Ready Handler, Egress Xfer Ready Handler, Ingress Send Command Handler, Egress Send Good Status Handler, Egress Send Bad Status Handler, Egress Send New Status Handler, and Discard I-Frame Handler.

The Ingress Command Handler function is used to handle command frame sent from the server to SP-Ingress. The entry point is fcp_cmd_i, and the path is UPSTREAM-INGRESS-COMMAND. The hardware classifier prompts to this function base on the VSX programmable E-type (CMD-I). Input includes the portion of command Frame in Data Pool (64 bytes).

Functions of the Ingress Command Handler include allocating IOCB from IOCB_pool (util_iocb_alloc), with allocated IOCB's ID be passed in w20, and reading the IOCB content into ScratchMem1 (4 QWs). The Ingress Command Handler also checks the frame ID of the incoming frame, initializes the expected inbound, outbound, internal frame IDs, and extracts the essential information from FC frame and store in IOCB (SP; FC_Handle).

Other functions of the Ingress Command Handler include setting SP_Handle and SP_Qualifier into the frame tag, copying the FC command frame to the staging area of IOCB, storing the identification of the second I-DS buffer that contains IOCB information to w22, and filling the own handle into the command frame.

Further functions of the Ingress Command Handler include storing the IOCB and staging area address into w28 and w30 respectively, and calling SCSI Manager to process the SCSI command (sm_cmd_i). The IOCB image in ScratchMem1 is updated but not the real IOCB's content. (The updated information should be flushed out after returning from the function.)

The passing information includes Command Frame in Data Pool (96 bytes), the IOCB address in w28, the IOCB staging area address in w30, the content of IOCB in ScratchMem1 (64 bytes—4 QWs). The Ingress Command Handler may then exit.

The Egress Command Handler function is used to handle command frame sent from the Initiator-Rainier to SP-Egress. The entry point is fcp_cmd_e, and the path is DOWN-STREAM-EGRESS-COMMAND.

The Hardware Classifier prompts to this function base on {iUCnMC, FHE, and FHF}. Inputs include the portion of command Frame in Data Pool (64 bytes), and RO contains the offset to the first byte of the frame header.

Due to buffer size mismatch, we will not send "local-command-handle" back to Initiator Rainier until XFR_RDY being received from target device.

Functions of the Egress Command Handler include validating the incoming E_frame (fcp_filter_fcp_efrm), and allocating IOCB from IOCB_pool (util_iocb_alloc), with the IOCB_Alloc function ensuring that allocated IOCB's ID are in w20.

In addition, the Egress Command Handler may read the IOCB content into ScratchMem1 (4 QWs), store IOCB and stage area address into w28 and w30 respectively, and check the frame ID of the incoming frame. Other functions of the Egress Command Handler include initializing the expected inbound, outbound, internal frame Ids, saving the peer_Handle and peer_Qualifier into IOCB, and initializing the FC_Handle to be 0xFFFF and zero out the control field.

The Egress Command Handler will also call LM to perform pLun lookup (lm_cmd_e). The lm_cmd_e function will ensure the the target port in IOCB and the MaxRxData in IOCB.

The Egress Command handler will further call FCP to send command frame to target device (fcp_snd_cmd_e), and enqueue the IOCB into port active queue. The Egress Command Handler may then flush the updated IOCB information from ScratchMeml to E-DS, and then exit.

The Ingress Data Handler function is used to handle data frame sent from the server to SP-Ingress. The entry point is fcp_data_i, and the path is UPSTREAM/DOWNSTREAM-INGRESS-DATA. The Hardware Classifier prompts to this function base on the VSX programmable E-type (DATA-I). Inputs include a portion of command Frame in Data Pool (32 bytes)

Functions of the Ingress Data Handler include validating the IOCB address (the returned SP_Handle in the received frame), and reading the IOCB content into ScratchMem1 (8 QWs). The Ingress Data Handler may match the frame content with IOCB content by checking the following fields: SP_Qualifier, Frame_ID, FC_Handle (if it would not be the first data frame), and Routing information (fcp_val_ri_i).

The Ingress Data Handler may also save FC_Handle into IOCB (on the first data frame), update the frame ID, peer_Handle, and peer_Qualifier, and call FCP to send data frame to the other Rainier (Initiator/Target-Rainier) (fcp_snd_data_i). The Ingress Data Handler may further flush the updated IOCB information from ScratchMeml to E-DS, and then Exit.

The Egress Data Handler function is used to handle data frame sent from the Initiator/Target-Rainier to SP-Egress. The entry point is fcp_data_e, and the path is UPSTREAM/DOWNSTREAM-EGRESS-DATA.

The Hardware Classifier prompts to this function base on {iUCnMC, FHE, and FHF). Inputs include a portion of data Frame in Data Pool (32 bytes).

Functions performed by the Egress Data Handler include validating the IOCB address (the passing peerOrPHandle in the received frame), and reading the IOCB content into ScratchMem1 (8 QWs). The Egress Data Handler may also match the frame content with IOCB content by checking the following fields: Own_Qualifier, Frame_ID, Peer_Handle and peer_Qualifier (if it would not be the first data frame), and Routing information (fcp_val_ri_e) (if it would not be the first data frame).

The Egress Data Handler may also save peer_Handle, peer_ Qualifier, and the completed routing information into IOCB (on the first data frame), swap the source and destination routing information, and update the FC_Handle, SP_Handle, SP_Qualifier, frame_ID, port_Handle, port_Number, and the frame control field.

The Egress Data Handler may call FCP to send data frame to the destination device (Initiator/Target device) (fcp_snd_data_e), update the running-byte-count field in IOCB, flush the updated IOCB information from ScratchMem1 to E-DS, and then exits.

The Ingress Status Hander function is used to handle status frame sent from the target device to SP-Ingress. The entry point is fcp_status_i, and the path is DOWNSTREAM-INGRESS-STATUS. The Hardware Classifier prompts to this function base on the VSX programmable E-type (STS-I). Inputs include a portion of command Frame in Data Pool (64 bytes).

Functions performed by the Ingress Status Handler include validating the IOCB address (the returned SP_Handle in the received frame), and reading the IOCB content into Scratch-Mem1 (8 QWs). Frame content is matched with IOCB content by checking the following fields: SP_Qualifier, Frame_ID, FC_Handle (if it would not be the first frame), and routing information (fcp_val_ri_i).

The Ingress Status Handler further saves FC_Handle into IOCB (on the first frame), updates the frame ID, peer_Handle, and peer_Qualifier, and calls FCP to send status frame to the Initiator-Rainier (fcp_snd_sts_i). The Ingress Status Handler also deallocates the IOCB from port active queue (util_remove_this), returns the IOCB to free IOCB-Pool, and then exits.

The Egress Status Handler function is used to handle status frame sent from the Initiator-Rainier to Host. The entry point is fcp_status_e, and the path is UPSTREAM-EGRESS-STATUS.

The Hardware Classifier prompts to this function base on {iUCnMC, FHE, and FHF}. Input includes a portion of command Frame in Data Pool (32 bytes). It is assumed that SM is responsible for building the status payload.

Functions of the Egress Status Handler include validating the IOCB address (the passing peerOrPHandle in the received frame), and reading the IOCB content into ScratchMem1 (8 QWs). The frame content is matched with IOCB content by checking the following fields own_Qualifier, Frame_ID, Peer_Handle and peer_Qualifier (if it would not be the first frame), and Routing information (fcp_val_ri_e) (if it would not be the first frame).

Other functions of the Egress Status Handler include saving peer_Handle, peer_Qualifier, and the completed routing information into IOCB (on the first frame). Other functions include swapping the source and destination routing information, storing the IOCB address in w28, and calling SCSI Management to log the IO status (sm_status_e).

Passing information includes Data Frame in Data Pool (32 bytes), the IOCB address in w28, and the Content of IOCB in ScratchMem1 (8 QWs). The Egress Status Handler then exits.

The Ingress Xfer Ready Handler function is used to handle xferRdy frame sent from the target device to SP-Ingress. The entry point is fcp_xfr_rdy_i, and the path is DOWNSTREAM-INGRESS-XFER_READY. This function is used to handle xferRdy frame sent from the target device to SP-Ingress.

The Hardware Classifier prompts to this function base on the VSX programmable E-type (XFRRDY-I). Input includes a portion of command Frame in Data Pool (64 bytes).

The Ingress Xfer Ready Handler functions to validate the IOCB address (the returned SP_Handle in the received frame), and to read the IOCB content into ScratchMem1 (8 QWs). The frame content is matched with IOCB content by checking the following fields: SP_Qualifier, Frame_ID, FC_Handle (if it would not be the first data frame), and routing information (fcp_val_ri_i).

The Ingress Xfer Ready Handler further confirms that Data_RO (in XfrRdy payload) is the same as IOCB.running-byte-cnt; otherwise calling FCP error handler (fcp_invalid_xfrrdy). The Ingress Xfer Ready Handler also saves FC_Handle into IOCB (on the first data frame), updates the IOCB.xfrrdy with the BURST_LEN (in XfrRdy payload), and updates the frame ID, peer_Handle, and peer_Qualifier. The Ingress Xfer Ready Handler calls FCP to send xferRdy frame to the other Rainier (Initiator-Rainier) (fcp_snd_xfr_rdy_i), flushes the updated IOCB information from ScratchMem1 to E-DS, and exits.

The Egress Xfer Ready Handler function is used to handle xferRdy frame sent from the target Rainier to SP-Ingress. The entry point is fcp_xfr_rdy_e, and the path is UPSTREAM-EGRESS-XFER_READY. The Hardware Classifier prompts to this function base on {iUCnMC, FHE, and FHF}. Input includes a portion of data Frame in Data Pool (32 bytes).

Functions performed by the Egress Xfer Ready Handler include validating the IOCB address (the passing peerOrPHandle in the received frame), and reading the IOCB content into ScratchMem1 (8 QWs). Frame content is matched with IOCB content by checking the following fields Own_Qualifier, Frame_ID, Peer_Handle and peer_Qualifier (if it would not be the first data frame), and Routing information (fcp_val_ri_e) (if it would not be the first data frame).

The Egress Xfer Ready Handler also saves peer_Handle, peer_Qualifier, and the source routing information into IOCB (on the first data frame), swaps the source and destination routing information and confirms that Data_RO (in XfrRdy payload) is the same as IOCB.running-byte-cnt; otherwise call FCP error handler (fcp_invalid_xfrrdy). The Egress Xfer Ready Handler updates the IOCB.xfrrdy with the $BURST_{13}$ LEN (in XfrRdy payload), and updates the FC_Handle, SP_Handle, SP_Qualifier, frame_ID, port_Handle, port_Number, and the frame control field. The Egress Xfer Ready Handler calls FCP to send xferRdy frame to the initiator device (fcp_snd_xfr_rdy_e), flushes the updated IOCB information from ScratchMem1 to E-DS, and exits.

The Ingress Send Command Handler function is used to flush the updated frame and IOCB's content to I-DS and E-DS respectively it will then en-queue the frame to I-EDS. The entry point is fcp_snd_cmd_i, and the path is UPSTREAM-INGRESS-COMMAND. The caller is SM.

Inputs comprise the frame's content in Datapool (the amount of QWs that contain the valid information should be predefined and ensured), the updated IOCB's content in ScratchMem1 (the amount of QWs that contain the valid information should be predefined and ensured), and that E-type, command payload, destination information have been built. Other inputs include IOCB.TBO is stored in w28, and the identification of the second I-DS buffer that contains command frame is stored in w22.

Functions performed by the Ingress Send Command Handler include flushing the updated information from Data Pool to I-DS, and sending the frame to the Target setting up the FCBPage {iUCMC, FHF, FHE} and enqueuing the frame to I-EDS. The Ingress Send Command Handler also flushes the updated IOCB information from ScratchMem1 to E-DS.

The Egress Send Good Status Handler function is used to flush the updated frame to E-DS and enqueue the frame to E-EDS. The entry point is fcp_snd_gdsts_e, and the path is UPSTREAM-EGRESS-STATUS. The caller is SM. Inputs comprise the frame's content in Data Pool, and that status payload and destination information have been built.

Functions of the Egress Send Good Status Handler include modifying the FC-frame (FC_Handle, SP_Handle, SP_Qualifier, frame_ID, FC_Port_Handle, and Port Number). The function does not need to swap the routing information because fcp_val_ri_e( ) has done it already. The Egress Send Good Status Handler also flushes the updated information from Data Pool to E-DS (3 QWs starting from the second QW in Data Pool). The frame is sent to the Initiator/Host to set up the FCBPage {QID}, and to enqueue the frame to E-EDS.

The Egress Send Bad Status Handler function is used to flush the updated frame to E-DS and enqueue the frame to E-EDS. The entry point is fcp_snd_badsts_e, and the path is UPSTREAM-EGRESS-STATUS. The caller is SM. Inputs include the frame's content in Data Pool, that status payload and destination information have been built, and the size of response payload in bytes is passed through w20.

Functions of the Egress Send Bad Status Handler include modifying the FC-frame (FC_Handle, SP_Handle, SP_Qualifier, frame_ID, FC_Port_Handle, and Port Number). The function does not need to swap the routing information because fcp_val_ri_e() has done it already.) The updated information is flushed from Data Pool to E-DS (base on the size of response payload passed by SM to calculate the number of QWs that need to be flushed from Data Pool to E-DS). The frame is sent to the Initiator/Host to set up the FCBPage {QID}, and to enqueue the frame to E-EDS.

The Egress Send New Status Handler function is used to build a new status frame and send to the host. The Entry Point is fcp_snd_new_sts_e, and the path is UPSTREAM-EGRESS-STATUS. The caller is SM.

Inputs include the frame's content in Datapool (the amount of QWs that contain the valid information should be pre-defined and ensured), that status payload and destination information have been built, and the size of response payload in bytes is passed through w20.

Functions of the Egress Send New Status Handler include modifying the FC-frame (POS-Header, Protocol, FC_Handle, SP_Handle, SP_Qualifier, frame_ID, FC_Port_Handle, and Port Number), setting up the control information, and setting the POS trailer. Other functions include allocating a new twin buffer to store the status frame content, building a new FCBPage with the essential information, and flushing the updated information from Data Pool to E-DS (base on the size of response payload passed by SM to calculate the number of QWs that need to be flushed from Data Pool to E-DS). The frame is sent to the Initiator/Host to set up the FCBPage {QID}, and to enqueue the frame to E-EDS.

The Discard I-Frame Handler function is used to discard the Ingress incoming frame. The entry point is fcp_discard_i, and the path is XXX-INGRESS-XXX. The caller is SM. It is assumed that the discarded frame information is stored in the active FCBPage. The function of the Discard I-Frame Handler is to enqueue the frame to ingress discard queue (i.e., I-DDQ).

The Discard E-Frame Handler function is used to discard the Egress incoming frame. The entry point is fcp_discard_e, and the path is XXX-EGRESS-XXX. The caller is FCP. It is assumed that the discarded frame information is stored in the active FCBPage. The Discard E-Frame hander functions to enqueue the frame to ingress egress discard queue (i.e., E-DDQ).

The following is a list of FCP private interfaces performed by the picocode (see FIG. 12): Egress Send Command Handler, Ingress Send Data Handler, Egress Send Data Handler, Ingress Send Status Handler, Ingress Send Transfer Ready Handler, Egress Send Transfer Ready Handler, Ingress Send Handle Response, Egress Filter FC-frame, Egress Invalid Check Sum, Ingress Validate Frame Routing Information, Egress Validate Frame Routing Information, Ingress Invalid FC Frame Information, Egress Invalid FC Frame Information, and Discard E-Frame Handler.

The Egress Send Command Handler Entry Point function is used to flush the updated frame to E-DS and enqueue the frame to E-EDS. The entry point is fcp_snd_cmd_e, and the path is DOWNSTREAM-EGRESS-COMMAND. The caller is FCP.

Inputs include the frame's content in Data Pool, and that command payload and destination information have been built. It is assumed that LM is responsible for preparing the FCB-Page, the frame routing information, and the port handle.

Functions of the Egress Send Command Handler Entry Point include swapping the source and destination routing information, setting the port number in the outgoing frame, and flushing the updated information from Data Pool to E-DS. The frame is sent to the Target Device to set up the FCBPage {QID}, and to enqueue the frame to E-EDS.

The Ingress Send Data Handler function is used to flush the updated frame to I-DS and enqueue the frame to I-EDS. The entry point is fcp_snd_data_i, and the entry path is UPSTREAM/DOWNSTREAM-INGRESS-DATA. The caller is FCP. Inputs include the frame's content in Datapool, and that data payload and destination information have been built.

Functions of the Ingress Send Data Handler include flushing the updated information from Data Pool to I-DS, and sending the frame to the other-Rainier to set up the FCBPage {iUCMC, FHF, FHE, TB, TDMU, iDSU}, and to enqueue the frame to I-EDS.

The Egress Send Data Handler function is used to flush the updated frame to E-DS and enqueue the frame to E-EDS. The entry point is fcp_snd_data_e, and the path is UPSTREAM/DOWNSTREAM-EGRESS-DATA. The caller is FCP.

Inputs comprise the frame's content in Datapool, and that data payload and destination information have been built. Functions of the Egress Send Data Handler include flushing the updated information from Data Pool to E-DS, and sending the frame to the Initiator-Rainier to set up the FCBPage {QID}, and to enqueue the frame to E-EDS.

The Ingress Send Status Handler function is used to flush the updated frame to I-DS and enqueue the frame to I-EDS. The Entry Point is fcp—snd_sts_i, and the path is DOWNSTREAM-INGRESS-STATUS. The caller is FCP.

Inputs include the frame's content in Datapool, and that status payload and destination information have been built. The Ingress Send Status Handler Function is used to flush the updated information from Data Pool to I-DS, and to send the frame to the Initiator-Rainier, setting up the FCBPage {iUCMC, FHF, FHE, TB, TDMU, iDSU}, and enqueuing the frame to I-EDS.

The Ingress Send Transfer Ready Handler function is used to flush the updated frame to I-DS and enqueue the frame to I-EDS. The Entry Point is fcp_snd_xfr_rdy_i, and the path is DOWNSTREAM-INGRESS-XFR READY. The caller is FCP, and the input is the frame's content in Datapool. The Ingress Send Transfer Ready Handler functions to flush the updated information from Data Pool to I-DS, and to send the frame to the Initiator-Rainier to Set up the FCBPage {iUCMC, FHF, FHE, TB, TDMU, iDSU}, and to enqueue the frame to I-EDS.

The Egress Send Transfer Ready Handler function is used to flush the updated frame to E-DS and enqueue the frame to E-EDS. The Entry Point is fcp_snd_xfr_rdy_e, and the path is UPSTREAM-EGRESS-XFR READY. The caller is FCP. The input is the frame's content in Datapool. Functions of the Egress Send Transfer Ready Handler include flushing the updated information from Data Pool to E-DS, and sending the frame to the Initiator-Rainier to set up the FCBPage {QID}, and to enqueue the frame to E-EDS The Ingress Send Handle Response function is used by Target Rainier to pass the command handle back to Initiator Rainier. The Entry Point is fcp_snd_hndl_resp_i, and the path is DOWNSTREAM-INGRESS-COMMAND. The caller is FCP. The input is the frame's content in Datapool (6 words).

Functions of the Ingress Send Handle Response include leasing the I-DS buffer, building the handle response frame, and sending the frame to the Initiator Rainier to set up the FCBPage2 {iUCMC, FHF, FHE, TB, TDMU, WBC}, and to enqueue the frame to I-EDS.

The Egress Filter FC-frame function is used to validate the egress-incoming frame. The entry point is fcp_filter_fcp_efrm, and the path is XXX-EGRESS-XXX. The caller is FCP. The input is the frame's content in Data Pool (6 QWs for command frame/4 QWs for others). Functions of the Egress Filter FC frame include performing check SUM, and return to caller if everything would be Okay; otherwise, invoke error event handler (fcpInvalCheckSumEfrm).

The Egress Invalid Check Sum function is used to handle check Sum error on any egress frame. The entry point is fcpInvalCheckSumEFrm. The caller is FCP. Functions of the Egress Invalid Check Sum include logging errors and discarding the frame (i.e., queuing the frame to E-DDQ).

The Ingress Validate Frame Routing Information function is used to validate the frame routing information. The entry point is fcp_val_ri_i. The caller is FCP. Inputs include the frame's content in Datapool, and IOCB's content in ScratchMem1. Functions include comparing the routing information within the IOCB and the incoming frame, and invoking FcpInvalIFrmInfo to handle the error if there would be a mismatch.

The Egress Validate Frame Routing Information function is used to validate the frame routing information. The entry point is fcp_val_ri_e. The caller is FCP. Inputs include the frame's content in Datapool, and the IOCB's content in ScratchMem1. Functions include comparing the routing information within the IOCB and the incoming frame, and invoking fcpInvalEFrmInfo to handle the error if there would be a mismatch; otherwise, swapping the frame's routing information.

The Ingress Invalid FC Frame Information function is used to handle mismatched information between IOCB and frame content. The Entry Point is fcpInvalIFrminfo, and the caller is FCP. Functions include logging errors, and discarding the frame (i.e., queuing the frame to I-DDQ).

The Egress Invalid FC Frame Information function is used to handle mismatched information between IOCB and frame content. The entry point is fcpInvalEFrmInfo, and the caller is FCP. Functions include logging errors and discarding the frame (i.e., queuing the frame to E-DDQ).

The Discard E-Frame Handler function is used to discard the Egress incoming frame. Its functions include enqueueing the frame to the ingress discard queue (i.e., E-DDQ).

This section describes the SCSI Manager component (SM) in the picocode subsystem (see FIG. 12). The main responsibility of SM is to process the SCSI specific information from the frames. On each command frame that comes in from the server, SM determines whether a HLUN exists. It uses FC-LUN, DevHandle, and the entry port in the SP to build the key and send it to the tree search engine. If the search is successful, it then passes the result to LM together with the start LBA and number of blocks. Otherwise it will try to either reject the command or send it to the SP to handle the command.

The LM will pick the path, physical target, LBA and pass them back. The SM then will modify the LBA in the CDB and send the command to the FCP to send it to the target SP.

The SM uses an Opcode Classifier Table to decide on how to act on a SCSI command. The Opcode Classifier Table is an array of 256 elements that are allocated from Control Store memory. Each element contains a number of flags.

These flags are as follows. Is-Read-Opcode, when set, identifies the opcode is a read (i.e. Read 10). Is-Write-Opcode, when set, identifies the opcode is a write (i.e. Write 10). Is-Reserve-Opcode, when set, identifies the opcode is a reservation (i.e. Reserve 6). Is-Release-Opcode, when set, identifies the opcode is a release (i.e. Release 6). Opcode-Is-Allowed-Without-HLUN, when set, identifies the opcode is allowed whether the LUN exists or not (i.e. Report LUNS). Opcode-Is-Allowed-With-UA-Set, when set, identifies the opcode is allowed when the Unit Attention condition on the LUN is set (i.e. Inquiry). Opcode-Is-Not-Affected-By-Reservations, when set, identifies the opcode is not affected by the reservation conflict (i.e. Read Block Limits).

The flags in each element are initialized according to its position in the table. SM uses the SCSI opcode from the command frame to index into this table. Based on the flags from the table, SM can decide which code path to take. When look up for the opcode classifier, the following formula is used:

Classifier address=Classifier-Table-Address+SCSI-Opcode

The SM features a number of public interfaces. One is the Upstream Ingress Command (E-Type=CMD-I). This entry point handles command frame that comes in from the server through the ingress side. The entry point is Sm_cmd_i, and is called by FCP. This public interface expects the Command Frame in Data Pool (96 bytes), the IOCB address in w28, the IOCB staging area address in w30, and the IOCB in Scratch 1. The public interface also expects own handle to be filled in the command frame (upstream handle), and own and peer FC-ID to be saved in IOCB.

Steps taken by the Upstream Ingress Command include starting the search for hlun (DevHandle, FCLUN, Port), and translating the information from command frame and save them to the IOCB if needed, including LBA, the number of blocks, the total byte count, and the data direction. Other steps include initializing the running byte count, getting the search result (expected in TSRO), calling sm_no_hlun_handler if hlun does not exist, and calling sm_no_rdwr_handler if the opcode is not read or write. Values passed to LM include Vlun LBA in w24, the number of blocks in w26, that the R20 0=Command is not a Read/Write and the search result in TSRO.

Another step taken includes calling lm_cmd_i. Expected return values from LM include Plun LBA in w24, the number of blocks in w26, the status code in r20, the native device flag in r18 (zero=native device), the Target Device FC-LUN in r21, the Target Blade filled in FCB page and IOCB, and the PlunHandle filled in the command frame.

If not a Native device, the LBA and the number of blocks in the CDB (data pool memory) are modified. Other steps include filling in the target device FC-LUN in the command frame, setting the e-type to CMD-E, enqueing the IOCB to the port active queue, and calling fcp_snd_cmd_i to send the command to the target SP. FCP will update the data-pool to I-DS and scratch 1 to CS.

Another public interface is the Upstream Egress Status (E-Type-Stat-E), which handles the status frame from a target device that comes in from the egress side via the downstream SP. The entry point is Sm_status_e, and the caller is FCP.

This interface expects the FC Response frame in Data Pool (64 bytes), the IOCB address in w28, and the IOCB in Scratch 1. Steps taken include call fcp_discard_e and returning if the status is not from the last child, modifying the response code in data pool as needed, dequeue the IOCB from the port active queue, calling fcp_snd_sts_e to send the status frame to the server, and returning the IOCB to the free pool.

The following public interfaces do not involve the SM: Downstream Egress Command (E-Type=CMD-E), Downstream Ingress Data (E-Type=Data-I), Upstream Egress Data (E-Type=Data-E), and Downstream Ingress Read Status (E-Type=Stat-I).

The SCSI Manager has two internal interfaces: sm_no_hlun_handler and sm_no_rdwr_handler.

The sm_no_hlun_handler entry point handles a command frame that targets to a non-existent hlun, and it is called by SM. This interface expects the Command Frame in Data Pool (96 bytes), the IOCB address in w28, the IOCB staging area address in w30, and the IOCB in Scratch 1.

Steps taken include calling sm_no_rdwr_handler if the opcode needs to be handled by E405 (i.e. inquiry, report LUNs), calling fcp_discard_i To discard the I-DS buffer, building the status payload in data pool, and calling fcp_snd_new_sts_e. Notes FCP will allocate new twin buffer and build new FCB page and send the frame to the server.

The sm_no_rdwr_handler entry point handles command frame other than read or write, and is called by SM. This interface expects the Command Frame in Data Pool (96 bytes), the IOCB address in w28, the IOCB staging area address in w30, and the IOCB in Scratch 1.

Steps taken include calling fcp_discard_i to discard the I-DS buffer, enqueuing the IOCB to the port active queue, and sending to the SP to handle the command.

This section describes the Lun Manager component in the picocode subsystem (see FIG. 12). The LM subsystem is in charge of decomposing a virtual request into physical ones. The LM subsystem looks at the starting LBA and number of blocks in a request from a server, and determines whether the device a native device or a virtual device.

The LM subsystem also identifies the start LBA and number of blocks of the physical request, and decomposes the virtual request into several physical IO's as needed. The LM subsystem determines where the new physical request should be sent to.

Information kept in tables on the e405/lc440 (virtual server card) does not have to be duplicated in its entirety on the SP, since the SP only handles a small subset of commands and because of the leaf size limitation on the TSE. Many of the byte fields and half word fields have been merged to 32 bit words in order to save cycles when accessing the tree search memory. The word fields will then have to be decomposed by picocode. This is faster since each pico thread has its own register set. With TS memory, there is contention from the other threads.

The HLUN structure ties the server with a VLUN. The HLUN entry contains a VLUNkey, SERVERkey. If the Tree Search lookup does not yield a leaf, this means that the server is not assigned to see the LUN requested. The key fed in to the TSE to yield a HLUN is the source port of the command, the FCLUN, and the DevHandle from the message header.

A HLUN is a binding between a server LUN and a VSX VLUN. The Key for server pdevpath is used to look up the server structure. The key for VLUN is used to look up the VLUN structure.

HLUN Leaf Structure is given as follows

```
hlun STRUCT
    vlunKey        word    ;key used to look for the VLUN
    initiatorKey   word    ;key used to look for the server pdevpath
    flags          word    ;ua29,lock/zoning,etc.
    fcaPortNpPort  byte    ;source fcaPort(2b) ,npPort(6b)
```

-continued

```
    linkCB         word    ;Address of the link control block
ENDS
```

The structure shown above is what is stored as leaf data in the SP tree search memory. This leaf is found through a search of DevHandle, command FCLUN and port number. The vlunKey field is used as the key to search for the VLUN leaf. The initiatorKey field is used as the key to search for the initiator PDEVPATH leaf. The intent of the flags field is used to indicate reservations, zoning and ua29. The fcaPortNpPort field is the source FCASIC port identifier (upper 2 bits) and the source SP port (lower 6 bits, in DDpppp) format of where the request came from.

The VLUN leaf contains information about a VLUN together with the composition of it. A VLUN can be made up of sections of a PLUN. This section is known as a slice.

The VLUN is a structure that describes what the VLUN is composed of. The VLUN contains the following features. LUN typecan be a virtual VSX device or a native device. State indicates the state of the VLUN. Total Blocks indicates the number of blocks on the VLUN. Block Size indicates the number of bytes/block.

The VLUN also contains information about that slice. A VLUN can include many PLUNs. Each component is referred to as a slice. The slice information kept includes the following. SLICE_END is the end of a slice with respect to the VLUN. SLICE_OFFSET is the offset within the PLUN. SLICE_BLKS is the number of blocks within the slice. PLUN_KEY is a key to search for the PLUN; the key is with respect to the slice.

The slices are kept as part of the VLUN structure. The picocode walks through the slices to determine which PLUN the IO goes to. With this, there may only be room for up to 3 slices.

Once a VLUN leaf is yielded from a Tree Search, the picocode will walk the slices to see which slices are involved in the request. Once the correct slice is identified, LM will use the sliceOffset to calculate the new start LBA of the request and update the wks. Requests that cross slice boundaries may be handled, and the LM may also calculate the requested blocks.

At the same time, a search for the PLUN is started using the pLunKey in the slice. This will yield a PLUN leaf.

The LPM search mechanism with Roping may be used, decoupling the slices from the VLUN. The search into the slices will use a VLUN key with the command start block address, yielding a leaf in the slice table. Picocode will then go to the next slice by walking the next element address in the leaf, with linking is provided by the Roping services.

The VLUN Leaf Structure is as follows.

```
vlun STRUCT
    vType          byte    ;virtual device type - stripe/mirror/native
    scsiDevType    byte    ;SCSI device type
    state          byte    ;state of this vlun
    totalBlks      word    ;total blks in vlun
    blkSize        word    ;blk size in vlun
    ;/* Slice 0 */
    slice0End      word    ;offset within VLUN
    slice0Offset   word    ;offset within the PLUN
    slice0Blks     word    ;blks in this slice
    plunKey0       hword   ;key of the plun
    ;/* Slice 1 */
    slice1End      word    ;offset within VLUN
```

-continued

```
    slice1Offset    word     ;offset within the PLUN
    slice1Blks      word     ;blks in this slice
    plunKey1        hword    ;key of the plun
    ;/* Slice 2 */
    slice2End       word     ;offset within VLUN
    slice2Offset    word     ;offset within the PLUN
    slice2Blks      word     ;blks in this slice
    plunKey2        hword    ;key of the plun
ENDS
```

The structure shown above is what is stored as leaf data in the SP tree search memory. This leaf is found from the vlun-Key found in the HLUN. The vType field identifies the whether the VLUN is a native device, concatenation, partition, mirror or stripe. The scsiDevType identifies whether the device is DISK, TAPE, SACL, etc. The state field tells the state of the VLUN, with a zero value specifying that it is operational. The totalBlks field specifies the total capacity of the VLUN, and this field is used by picocode to check the request bounds. The blkSize field is the bytes/block for the VLUN, and can be used to calculate the number of bytes of a request.

There are three slices in a VLUN, allowing a VLUN to be constructed out of three physical devices. Fields in a single slice are as follows.

The sliceEnd field is the ending block number of the VLUN in the slice. The sliceOffset field is the offset into the PLUN in the slice. The sliceBlks field is the number of blocks in the slice. The plunKey field is used to search for the PLUN the slice is associated with.

The PLUNup table is used on the upstream SP to look for the PLUN. There is a PLUNdown table that is used by the downstream SP. The PLUNdown table contains smaller leaf sizes.

The PLUN leaf contains the following information. The LunNumber is the physical lun number. The Block Size is the bytes/block for the physical LUN. The Target DMU is a field which specifies which DMU to send this request downstream, which matters since there are two egress datastores. Regarding DS0/1, DS0 is connected to DMU A/B and DS1 is connected to DMU C/D. The Target DS field specifies which DS on the egress side to send the request to. The Target Blade field specifies the target blade number of the request.

The PLUN leaf also contains the Downstream LID, which is a key used by the downstream SP to search for the PLUN or PDEVPATH. The MSB specifies whether the key is used to search for a PLUN or PDEVPATH. If the downstream SP has multiple paths to the device, the key is used to search for the PLUN, otherwise it is used to search for the PDEVPATH.

The LM will search for a PLUN leaf using the plunKey in the VLUN leaf. From the leaf, LM may update a register with the physical fclun field, update the FCBpage TB field after choosing a path, update the FCBpage target DMU/DSU fields, and update the Ethernet encapsulation header LLC field with the PathLID.

The PLUN Leaf Structure is as follows.

```
plunUp STRUCT
    lunNum          hword    ;lun number within the physical device
    totalBlks       word     ;total blks in this lun
    blkSize         word     ;blk size of this lun
    prefPath        byte     ;preferred path to take
    ;/* Path 0 - 10 bytes */
    path0St         byte     ; State(4b) ,rsv(3) ,prio(1b)
    path0PortDmuDsu byte     ; Port(1b) ,rsv(1b) ,dmu(2b) ,dsu(4b)
    path0BladeQid   word     ; Blade(2B), rsv(5b), QID(10b)
    path0Lid        word     ; lookup id for downstream PLUN/PDP.
    ;/* Path 1 - 10 bytes */
    path1St         byte
    path1PortDmuDsu byte
    path1BladeQid   word
    path1Lid        word
    ;/* Path 2 - 10 bytes */
    path2St         byte
    path2PortDmuDsu byte
    path2BladeQid   word
    path2Lid        word
ENDS
```

The lunNum field is the LU number of the LU behind the port. The totalBlks is the total blocks in the LU. The blkSize is the block size of the LU. The prefpath field is an indicator of which path to use, and is a static path selection. If a path needs to be changed, the SMS will update the field. The pathSt field is used to indicate the state of the path. The pathPortDmuDsu is used to indicate the target blade DMU and DSU, and is used when programming the FCBpage registers.

The bladeQid field is a concatenation of the target blade and the source QID. The QID is programmed into the source routing information, and may be used to program into the FCBpage when responses come back into the egress side.

The pathLid field is used as a lookup for the downstream SP. In the pathLid, the MSbit indicates whether there are multiple paths to the device downstream. If the MSbit is clear, there is only a single path. The pathLid will then be used to lookup for a pdevpath downstream. If the MSbit is set, the lookup will be for a PLUN.

On the downstream side, the LM will look into the LLC field of the Ethernet encapsulation header and extract the LID. The LID can be used to search for either the PLUNdown leaf or the pDevPath leaf directly. If there are multiple paths to the PLUN on the downstream SP, the LID will have the MPATH bit set. The LID will then be used as a key to the TSE to search the PLUNdown tree for a leaf. If the MPATH bit is clear, then there is only a single path and the LID will be used to search the pDevPath tree directly.

The PLUNdown leaf contains the following. The prefpath. is the preferred path to use. The pathState is the state of a particular path. The pathKey is used to search for the pDev-Path leaf. LM will choose a path using the prefPath and pathState fields and start a search on the pDevPath tree.

The PLUNdown Leaf Structure is as follows.

```
plunDown STRUCT
    prefPath        byte    ;preffered path to take
    ;/* Path 0 */
    path0State      byte    ;state of this path
    path0Key        word    ;key of the pDevPath
    ;/* Path 1 */
    path1State      byte    ;state of this path
    path1Key        word    ;key of the pDevPath
    ;/* Path 2 */
    path2State      byte    ;state of this path
    path2Key        word    ;key of the pDevPath
ENDS
```

The PLUNdown structure is used on the downstream side. The prefPath structure is used to select 3 possible paths to a PLUN. The pathState field indicates the state of a path. The pathKey is used as a key to look for the pdevpath leaf.

A pdevpath is a structure that can represent a physical connection to a storage or server, but does not represent LUNs behind the physical storage. A pedevpath contains the following.

FC_ID is the server or storage FC id. The MaxRxData field shows the maximum frame size the storage/server can receive. The Bbcredit field is the number of BB credits the server/storage has given during the LOGIN process. Port is the port number on the SP which the server/storage is attached.

A pDevPath leaf can represent a server or a path to a storage device. A key to the server pDevPath comes from a field in the HLUN leaf. The key to the device pDevPath comes from the LID in the Ethernet encapsulation header on the downstream SP.

The pDevPath Leaf Structure is as follows.

```
pDevPath STRUCT
    portHandle      word    ;FCASIC portHandle
    port            byte    ; SP port number
    fcaPort         byte    ; FC ASIC port number
ENDS
```

The portHandle field is a handle to the physical device that is known to the FCASIC. When picocode performs IO to a physical device, it passes this handle down to the FCASIC for it to identify the device. The port field is the SP port number in DDpppp format. The fcaPort field is the FC ASIC port identity.

A port structure contains information about our own SP port. It contains information such as FCID, which is used by the FCP code. The port structures are in tree search memory. Since there are only a small number of ports on the SP, the lookup is done using an index into an array to find the port CB address. This should be faster than using the TS engine.

The following paragraphs describe how the LM tables in the TSE become populated.

The LM tables in the TSE get populated from the LM in the virtual server card. The LM in the VSC has similar structures to that used by picocode. The difference between them is that the picocode structures are more compact and integrated.

Pdevpath leafs (see structure below) exist for a physical device on the SP on which it is attached, and thus a pdevpath leaf will be programmed on the SP where a storage device or initiator is attached.

The pdevpath fields in the leaf are filled in entirely from the PDEVPATH structure in the VSC.

```
typedef struct
{
    U32     fcaDevHandle    __PKD__;  /* FCASIC device handle */
    U8      npPort          __PKD__;  /* ppppDD format */
    U8      fcaPortId       __PKD__;  /* FCA port identity (2b) */
} picoPdpT                  __PKD__;
```

The fcaDevHandle is filled in from the VSC (also referred to as the e405) pdevpath.fcaDevHandle. This field was given to the e405 when a new device was found by the FC ASIC, and is a handle to the device used by the FC ASIC.

The npPort is filled in from the e405 pdevpath.npPort. This field has 2 elements, port and DMU, and was given to the e405 when a new device was found. The npPort field indicates which DMU the device is attached to. Since the SP is operating in POS format, the port number is 0.

The fcaPortId is filled in from the e405 pdevpath.fcportIld. It is an identity of the FC ASIC port on which the device was discovered, and is given to the e405 when a "New Device Report" is sent. The key used to program the pdevpath leaf is the pdevpath.pdHandle.

The PLUNUP Leaf (see structure below) exists on the SP where there is VLUN exported to a host, and is used by the SP to find where to ship the frame downstream. The lunNum is filled directly from the e405 plun.lunNum field, and is the LU number behind the physical device. The totalBlks is filled from the e405 plun.blkCount field. The blkSize is filled from the e405 plun.blkSize.

The PLUNUP leaf contains 3 paths to the downstream SP, similar to the array of pdevpath pointers in the e405 PLUN structure. The prefPath field instructs picocode to use a particular path. The configuration sw will look at the plun.preferred path to fill in the correct index in the leaf.

The pathSt field is used to indicate the state of a path. It is filled from the e405 plun.path.state field. The e405 goes the pdevpath structure from the PLUN to get this field.

The pathPortDmuDsu is a combination of the downstream FCASIC portId, target downstream DMU, and DSU, and is filled in from the plun.path.fcaPortId and the plun.path.bladePort fields. The configuration software can determine the DSU from the plun.path.bladePort field. The DMUI/DSU fields have to be determined in advance because the FCBpage is filled in with these target parameters.

The bladeQid field is a combination of the target downstream blade number and the QID parameter. The QID parameter is for the scheduler, and is filled in from the plun.path.bladeId. The bladeLid field is used as a lookup on the downstream SP to find either the PLUNDown or PDEVPATH leaf, and is filled in from the plun.path.bladeLid field.

The key used to program this leaf is the plun.plHandle.

```
typedef struct
{
    U16     lunNum          __PKD__;
    U32     totalBlks       __PKD__;
    U32     blkSize         __PKD__;
    U8      prefPath        __PKD__;
```

```
        /* Path 0 */
        U8          path0St             _PKD_;
        U8          path0PortDmuDsu     _PKD_;
        U32         path0BladeQid       _PKD_;
        U32         path0Lid            _PKD_;
        /* Path 1 */
        U8          path1St             _PKD_;
        U8          path1PortDmuDsu     _PKD_;
        U32         path1BladeQid       _PKD_;
        U32         path1Lid            _PKD_;
        /* Path 2 */
        U8          path2St             _PKD_;
        U8          path2PortDmuDsu     _PKD_;
        U32         path2BladeQid       _PKD_;
        U32         path2Lid            _PKD_;
    } picoPlunUpT                       _PKD_;
```

VLUN leafs (see structure below) are programmed in to the SP where there is a host with the VLUN exported. The vtype field is filled in from the e405 vlun.type field. The scsiDev-Type field is filled in from the e405 vlun.devType field. The state is filled in from the e405 vlun.state field. The totalBlks and blkSize are filled in from the e405 vlun.totalBlks and vlun.blkSize fields.

The vlun can be created out of 3 slices. The sliceEnd field is the ending virtual block in the slice, and is filled from the e405 vlun.slice.vlunEnd. The sliceOffset field is the offset into the PLUN, and is filled in from the e405 vlun.slice.plun-Offset. The sliceBlks field is the number of blocks in the slice, and is filled in from the e405 vlun.slice.blkCount. The plun-Key field is used as the key for looking up the PLUN, and is filled in from the e405 vlun.slice.dev.handle.

The key used to program this leaf is the vlun.handle.

```
    typedef struct
    {
        U8          vType               _PKD_;
        U8          scsiDevType         _PKD_;
        U8          state               _PKD_;
        U32         totalBlks           _PKD_;
        U32         blkSize             _PKD_;
        /* Slice 0 */
        U32         slice0End           _PKD_;
        U32         slice0Offset        _PKD_;
        U32         slice0Blks          _PKD_;
        U16         plunKey0            _PKD_;
        /* Slice 1 */
        U32         slice1End           _PKD_;
        U32         slice1Offset        _PKD_;
        U32         slice1Blks          _PKD_;
        U16         plunKey1            _PKD_;
        /* Slice 2 */
        U32         slice2End           _PKD_;
        U32         slice2Offset        _PKD_;
        U32         slice2Blks          _PKD_;
        U16         plunKey2            _PKD_;
    } picoVlunT                         _PKD_;
```

The HLUN leaf (see structure below) is programmed into the SP where there is a VLUN exported to a host. The vlunKey is used to look up the VLUN leaf, and is filled in from e405 hlun.vLun.handle field. The initiatorKey is used to look up the host pdevpath leaf, and is filled in from the e405 hlun-.src.pdHandle field.

The fcaPortDmuDsu is used as the source fcaPort, DMU and DSU fields, and is taken from the hlun.src.fcaPortId and hlun.npPort, which indicates the DMU. The DSU field is figured out from the DMU.

The eHandle field is a handle to the e405 HLUN and will be passed back to the e405 when a proxy command comes in to provide a fast lookup to the HLUN structure.

The key used to program the leaf is based on the FCA-PORTID, DevHandle, and FCLUN.

```
    typedef struct
    {
        U32         vlunKey             _PKD_;
        U32         initiatorKey        _PKD_;
        U32         flags               _PKD_;
        U8          fcaPortDmuDsu       _PKD_;
        U32         eHandle             _PKD_;
        U32         linkCB              _PKD_;
    } picoHlunT                         _PKD_;
```

The PLUNDown leaf (see structure below) is programmed onto the SP where the storage device is connected. The prefPath field is used to indicate which path index to use when sending the frame out, and is filled in from the plun.prefferedPath field.

There are 3 paths to choose from. The pathState field is used to indicate the state of the path. It is filled in from the e405 plun.path.state. The pathKey is filled in from the e405 plun.path.pdHandle.

```
    typedef struct
    {
        U8          prefPath            _PKD_;
        /* Path 0 */
        U8          path0State          _PKD_;
        U32         path0Key            _PKD_;
        /* Path 1 */
        U8          path1State          _PKD_;
        U32         path1Key            _PKD_;
        /* Path 2 */
        U8          path2State          _PKD_;
        U32         path2Key            _PKD_;
    } picoPlunDownT                     _PKD_;
```

The storage server 100 implements various public interfaces, including lm_cmd_i and lm_cmd_e, as follows.

The lm_cmd_i walks the VLUN structure to calculate the new starting LBA and number of blocks for the request. It will pick a path in the case where the PLUN is connected through multiple paths. The path is UPSTREAM INGRESS COMMAND, and it is called by SM upstream after it starts the TSE to check for existence of a HLUN.

The following data is used. IoCB should be in scratch1 shared memory. Tree search results for a HLUN should be in TSRO area. The frame should be in datapool. The W24 should have the LBA, w26 should have the number of blocks.

The R20 is the RDWR flag. 0=RDWR 1=NOT RDWR command. LM will not modify startLBA and reqBlks if not RDWR command.

The following data is modified. Iocb.hpLun will have the leaf address of the hlun. PlunHandle is used for downstream lookup will be inserted into the TAGS porthandle field—W24 will have the physical LBA and W26 the physical number of blocks. FCBpage TDMU register are updated. FCBpage DSU register are updated.

FCBpage TB registers are updated with the target blade. TAGS.src.TB are modified with TB of this SP. TAGS.src.QID are modified with the target port used for enqueing at the upstream side. TAGS.src.FCAport are modified with the upstream FCASIC port identifier. TAGS.src.DMU are modified with the upstream DMU used to return data to initiator.

TAGS.src.DSU are modified with the upstream target DS unit used in order to return data to initiator.

IoCB.riTblade will be filled with the target blade. IoCB.riTqid are filled with the target QID. IoCB.riPortDmuDsu are filled with the target port, DMU, DSU.

Return data is as follows R20—status as defined in vsxstat.inc, R21—FCLUN, R18—0 if VLUN is native, 1 if VLUN is NOT native, W24—new startLBA, and W26—new ReqBlks.

The lm_cmd_e is used to pick a path to the physical device, as is done from the plunHandle passed in the packet LLC field. The path is DOWNSTREAM EGRESS COMMAND, and it is called by FCP downstream after receiving a command packet. The command uses various inputs including IoCB stored in scratch1 shared memory.

Modified data includes TAGS.dst.TB modified with the destination target blade, TAGS.dst.QID modified with the target port used for enqueing at the downstream side, if known. Other modified data includes TAGS.dst.FCAport modified with the downstream FCASIC port identifier, if known, TAGS.dst.DMU modified with destination target DMU, TAGS.dst.DSU modified with destination target DSU, and IoCB.tgtPort will have the SP port number connected to the device.

Further modified data includes IoCB.maxRxData will have the maximum data the device can receive, IoCB.hpLun will have the leaf address of the plun, and IoCB.prefPath will have the preffered path picked.

Return data includes R20—status as defined in vsxstat.inc, R21—maxRxdata of device, and R15[1]—output port.

In operation, the code will extract the handle passed in from the upstream SP in the Ethernet LLC header field. If the handle has the multipath bit set, the handle will be used to search in the PLUN tree. From the PLUN leaf, a path will be selected. Each path in the PLUN leaf has a key. The key will be used to search through the PDEVPATH table. The PDEVPATH leaf will have the device information. Inside the PDEVPATH, the port will be used to search for the FCPORT structure, which is another PDEVPATH leaf.

In the case where the multipath bit is NOT set, there is only a single path to the device. The key is used to look directly into the PDEVPATH table. This provides the device PDEVPATH leaf. The search for the FCPORT structure is still performed.

Although the above description has focused on specific embodiments, various alternatives and equivalents would be within the understanding of one of ordinary skill in the art. Therefore, the invention is to be defined with reference to the following claims and their equivalents.

What is claimed is:

1. A storage server in a storage area network connecting a plurality of host computers and a plurality of storage devices, the storage server comprising:
   a switching circuit in the storage server that connects a plurality of storage processors and associates a first storage processor from the plurality of storage processors with said plurality of host computers and further associates a second storage processor from the plurality of storage processors with said plurality of storage devices, wherein said plurality of storage processors in the storage server receive a plurality of command packets and a plurality of data packets; and
   a microengine in each of the plurality of storage processors to process said plurality of command packets and plurality of data packets using microcode and configure a routing path through said switching circuit to establish communication between the first storage processor and the second storage processor, wherein the microcode executing on the microengines from the first of the one or more of the plurality of storage processors is responsive to at least one command packet of said plurality of command packets and embeds routing instructions for the routing path directly in each data packet of said plurality of data packets over said path using one or more microcode instructions in the microcode thereby allowing initial routing operations for a data packet between said first storage processor and said second storage processor through said switching circuit to take place prior to completely receiving said data packet in the entirety, and further configures a plurality of paths between the second storage processor and a storage device from the plurality of storage devices in accordance with said command packet.

2. The storage server of claim 1, wherein said first storage processor includes a lookup table that associates one or more virtual logical unit numbers (VLUNs) with one or more physical logical unit numbers (PLUNs), wherein said one or more PLUNs are associated with said plurality of storage devices, and wherein said one or more VLUNs are virtualizations of said one or more PLUNs.

3. The storage server of claim 1, further comprising:
   a plurality of microengines, wherein said plurality of microengines are components of said plurality of storage processors.

4. The storage server of claim 1, wherein said plurality of data packets are received from one of said plurality of host computers.

5. The storage server of claim 1, wherein said plurality of data packets are received from one of said plurality of storage devices.

6. The storage server of claim 1, wherein said plurality of data packets are received from more than one of said plurality of storage devices.

7. The storage server of claim 1, wherein said plurality of data packets are routed to one of said plurality of host computers.

8. The storage server of claim 1, wherein said plurality of data packets are routed to one of said plurality of storage devices.

9. The storage server of claim 1, wherein said plurality of data packets are routed to more than one of said plurality of storage devices.

10. The storage server of claim 1, wherein said first storage processor receives said command packet from one of said plurality of host computers.

11. The storage server of claim 1, wherein said first storage processor receives said command packet from one of said plurality of storage processors.

12. The storage server of claim 1, wherein said first microengine uses a command handle in said command packet to perform a tree search to configure said path.

13. The storage server of claim 1, wherein said first storage processor passes a handle to said second storage processor.

14. The storage server of claim 1, wherein said first storage processor and said second storage processor are a single storage processor.

15. The storage server of claim 1, wherein said first microengine routes said data packet according to a routing tag therein.

16. The storage server of claim 1, further comprising:
   a virtual server controller configured to program, via a configuration command, a lookup table in one of said plurality of storage processors, wherein said lookup table associates one or more virtual logical unit numbers (VLUNs) with one or more physical logical unit numbers (PLUNs).

17. A method of routing data in a storage area network having a storage server between a plurality of host computers and a plurality of storage devices, the method comprising:

associating a first storage processor from a plurality of storage processors with said plurality of host computers and a second storage processor from the plurality of storage processors with said plurality of storage devices wherein said plurality of storage processors are in the storage server;

receiving a plurality of command packets and a plurality of data packets to be processed on at least one microengine associated with the plurality of storage processors;

configuring a routing path between a first storage processor and a second storage processor of said plurality of storage processors in response to receipt of a command packet of said plurality of command packets; and embedding routing instructions from the routing path directly in each data packet of said plurality of data packets to be transmitted over said routing path thereby allowing initial routing operations for a data packet between said first storage processor and said second storage processor to take place prior to completely receiving said data packet in the entirety; and configuring a plurality of paths between the second storage processor and a storage device from the plurality of storage devices in accordance with said command packet.

18. The method of claim 17, wherein the routing operations for said data packet over said path further comprises routing said data packet to one of said plurality of host computers.

19. The method of claim 17, wherein the routing operations for said data packet over said path further comprises routing said data packet to one of said plurality of storage devices.

20. The method of claim 17, wherein the routing operations for said data packet over said path further comprises routing said data packet to more than one of said plurality of storage devices.

21. The method of claim 17, wherein the first storage processor includes a lookup table that associates one or more virtual logical unit numbers (VLUNs) with one or more physical logical unit numbers (PLUNs), wherein said one or more PLUNs are associated with said plurality of storage devices, and wherein said one or more VLUNs are virtualizations of said one or more PLUNs.

* * * * *